(12) United States Patent
Hashimoto et al.

(10) Patent No.: US 8,967,816 B2
(45) Date of Patent: Mar. 3, 2015

(54) REAR UNDER MIRROR

(75) Inventors: Toshihiro Hashimoto, Haga-gun (JP);
Yuya Kishimoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 345 days.

(21) Appl. No.: 13/640,565

(22) PCT Filed: Apr. 26, 2011

(86) PCT No.: PCT/JP2011/060135
§ 371 (c)(1),
(2), (4) Date: Oct. 11, 2012

(87) PCT Pub. No.: WO2011/136206
PCT Pub. Date: Nov. 3, 2011

(65) Prior Publication Data
US 2013/0033774 A1  Feb. 7, 2013

(30) Foreign Application Priority Data

Apr. 27, 2010 (JP) ................................. 2010-102152
May 17, 2010 (JP) ................................. 2010-113265

(51) Int. Cl.
*G02B 5/08* (2006.01)
*B60R 1/08* (2006.01)
*G02B 5/10* (2006.01)

(52) U.S. Cl.
CPC .. *B60R 1/082* (2013.01); *G02B 5/10* (2013.01)
USPC ........................................................ 359/850

(58) Field of Classification Search
CPC .......... B60R 1/08; B60R 1/081; B60R 1/082; G02B 5/10; G02B 23/14
USPC ................. 359/850, 865, 866, 868, 872
See application file for complete search history.

(56) References Cited

U.S. PATENT DOCUMENTS

| | | | |
|---|---|---|---|
| 5,005,963 A | 4/1991 | Schmidt et al. | |
| 6,398,377 B1 * | 6/2002 | Chou | 359/868 |
| 7,600,877 B2 * | 10/2009 | Behbehani | 359/868 |
| 7,686,464 B2 * | 3/2010 | Compton et al. | 359/866 |
| 2005/0180034 A1 | 8/2005 | Schmidt et al. | |

FOREIGN PATENT DOCUMENTS

| | | |
|---|---|---|
| GB | 2 219 977 | 12/1989 |
| JP | 61-287842 | 12/1986 |

(Continued)

OTHER PUBLICATIONS

European Search Report dated Sep. 6, 2013, Application No. 11774987.9, 3 pages.

*Primary Examiner* — Euncha Cherry
(74) *Attorney, Agent, or Firm* — Rankin, Hill & Clark LLP

(57) ABSTRACT

A rear under mirror that is placed near a top edge portion of a rear window glass on a vehicle compartment interior side thereof, the rear under mirror including: a reflecting mirror that reflects a lower area behind a vehicle towards a driver's seat, the reflecting mirror comprising a concavo-convex mirror having a mirror surface that is formed as a concave surface in a substantially vertical direction and as a convex surface in a substantially horizontal direction, the reflecting mirror having a radius of curvature of the convex surface in a substantially horizontal direction of the reflecting mirror in the bottom portion area is larger than that of the top portion area, the reflecting mirror having a trapezoidal shape whose bottom side is longer than top side when viewed from a front thereof.

15 Claims, 22 Drawing Sheets

(56) References Cited

FOREIGN PATENT DOCUMENTS

| JP | 5-330384 | 12/1993 |
| JP | 7-15440 | 3/1995 |
| JP | 3093470 | 2/2003 |
| JP | 2009-029178 | 2/2009 |
| JP | 2009-208747 | 9/2009 |
| JP | 2009-234493 | 10/2009 |

* cited by examiner

REAR UNDER MIRROR

BACKGROUND OF THE INVENTION

1. Field of the Invention

The present invention relates to a rear under mirror that is located near the rear window of a vehicle and reflects a lower area behind the vehicle body.

Priority is claimed on Japanese Patent Application No. 2010-113265, filed May 17, 2010, and No. 2010-102152, filed Apr. 27, 2010, the contents of which are incorporated herein by reference.

2. Description of the Related Art

Convex mirrors that are capable of reflecting a wide area by a reflecting surface having only a small surface area are widely used as the aforementioned type of rear under mirror. However, in the case of a convex mirror, the image reflected on the mirror surface is an inverted mirror image, and it is easy for a user to become confused by such an image.

Conventionally, concavo-convex mirrors having a mirror surface which is formed as a concave surface in a substantially vertical direction and as a convex surface in a substantially horizontal direction are commonly used for rear under mirrors that solve the aforementioned problem (see, for example, Patent document 1).

According to this type of conventional rear under mirror, a wide area in the vehicle width direction is reflected by the surface of the reflecting mirror that is convex in a substantially horizontal direction. In addition, an erect image that is formed by the surface of the reflecting mirror that is concave in a substantially vertical direction is able to be viewed by the user. (see, for example, Japanese Unexamined Patent Application No. S61-287842 (Patent document 1)).

However, this type of rear under mirror which uses a concavo-convex mirror for the reflecting mirror has a complex curved surface in which the mirror surface of the reflecting mirror is curved three-dimensionally. Accordingly, they require a certain depth in the front-rear direction. If the rear under mirror is installed inside the rear window glass, then further pressure is placed on the vehicle compartment space.

In order to ensure visibility, it is necessary for the reflecting mirror of a rear under mirror to have a surface area of at least a certain size. As a consequence, the length in the depth direction becomes elongated in accordance with the surface area of the reflecting mirror. However, the position at the rear end of the vehicle compartment interior is delimited by the rear window glass and the back door panel. If the length in the depth direction of a rear under mirror becomes too elongated, the area on the front side occupied by the rear under mirror expands onto the roof lining side inside the vehicle compartment.

Moreover, if the entire reflecting mirror of the rear under mirror is reduced in size, the surface area of the portion that reflects the lower area behind vehicle body becomes smaller. As a result of this, visibility is reduced.

SUMMARY OF THE INVENTION

The present invention provides a rear under mirror that makes it possible to reduce the pressure that is placed on the vehicle compartment space without sacrificing visibility.

Normally, the types of rear under mirror that reflect the lower area behind a vehicle are used with the occupant of the driver's seat already seated and looking back over their shoulder. Because of this, the position where the reflecting mirror of the rear under mirror can be installed in the vehicle width direction is somewhat restricted.

As a result of this, even if objects situated in a lower area behind the vehicle body are the same distance from the center in the vehicle width direction, the size of an object appears in the reflecting mirror to be different when the object is on the right side in the vehicle width direction compared to the size of the object when the object is on the left side in the vehicle width direction. In particular, when a curved mirror surface having a convex surface and a concave surface in the reflecting mirror is used, the difference between the sizes of such objects is especially conspicuous. If the size of an object on the left side in the vehicle width direction appears different from the size of an object on the right side in this manner, it becomes difficult for the driver to ascertain the size and position of an object.

Therefore, it is another object of the present invention to provide a rear under mirror that is able to reduce the differences in appearance between an object situated in a lower area behind a vehicle body which is on the left side in the vehicle width direction and an object situated in a lower area behind a vehicle body which is on the right side in the vehicle width direction, and that makes it possible for a driver to rapidly and accurately ascertain the situation in the lower area behind the vehicle.

(1) A rear under mirror according to an aspect of the present invention is a rear under mirror that is placed near a top edge portion of a rear window glass on a vehicle compartment interior side thereof, the rear under mirror including: a reflecting mirror that reflects a lower area behind a vehicle towards a driver's seat, the reflecting mirror comprising a concavo-convex mirror having a mirror surface that is formed as a concave surface in a substantially vertical direction and as a convex surface in a substantially horizontal direction, the reflecting mirror having a trapezoidal shape whose bottom side is longer than top side when viewed from a front thereof.

(2) The above-described rear under mirror may also be formed in the following way: the mirror surface of the reflecting mirror is bilaterally symmetric in a vehicle width direction.

(3) The above-described rear under mirror may also be formed in the following way: a radius of curvature of the concave surface in a substantially vertical direction of the reflecting mirror in a bottom portion area is smaller than that of a top portion area.

(4) The above-described rear under mirror may also be formed in the following way: the radius of curvature of the concave surface in the substantially vertical direction of the reflecting mirror becomes gradually smaller in a manner so as to approach the bottom portion area from the top portion area.

(5) The above-described rear under mirror may also be formed in the following way: a radius of curvature of the convex surface in a substantially horizontal direction of the reflecting mirror in the bottom portion area is larger than that of the top portion area.

(6) The above-described rear under mirror may also be formed in the following way: the radius of curvature of the convex surface in the substantially horizontal direction of the reflecting mirror becomes gradually larger in a manner so as to approach the bottom portion area from the top portion area.

(7) The above-described rear under mirror may also be formed in the following way: an acute bend area in which the radius of curvature of the concave surface in the substantially vertical direction is smaller than in other areas is provided in an area adjacent to a bottom end of the reflecting mirror.

(8) The above-described rear under mirror may also be formed in the following way: an area adjacent to the bottom end of the concave surface in the substantially vertical direction of the reflecting mirror reflects a rear end portion of the vehicle.

(9) Furthermore, A rear under mirror provided near a rear window at a rear portion of a vehicle, the rear under mirror including:
   a reflecting mirror that reflects a lower area behind the vehicle towards a driver's seat, wherein
   a radius of curvature of a mirror surface of the reflecting mirror on one end side which is closer to the driver's seat in a vehicle width direction is smaller than that of the other end side in the vehicle width direction.

(10) The above-described rear under mirror may also be formed in the following way: the mirror surface is provided with a convex surface that is formed in a convex shape in a substantially horizontal direction.

(11) The above-described rear under mirror may also be formed in the following way: the mirror surface is provided with a concave surface that is formed in a concave shape in a substantially horizontal direction.

(12) The above-described rear under mirror may also be formed in the following way: the mirror surface is provided with a convex surface that is formed in a convex shape in a substantially vertical direction.

(13) The above-described rear under mirror may also be formed in the following way: the mirror surface is provided with a concave surface that is formed in a concave shape in a substantially vertical direction.

(14) The above-described rear under mirror may also be formed in the following way: the radius of curvature of the mirror surface becomes larger in a manner so as to approach the other end side in the vehicle width direction from said one end side which is closer to the driver's seat in the vehicle width direction.

(15) The above-described rear under mirror may also be formed in the following way: the curvature of the reflecting mirror is set such that objects of the same size that are the same distance from the center of the vehicle width direction are reflected as images of the same size in both said one end side in the vehicle width direction, which area is closer to the driver's seat, and the other end side in the vehicle width direction.

(16) The above-described rear under mirror may also be formed in the following way: the reflecting mirror is positioned in the center in the vehicle width direction of the rear portion of the vehicle body.

According to the aspect described above in (1), it is possible to reduce the space in the vehicle longitudinal direction occupied by the top side portion of a reflecting mirror. At the same time, it is possible to reflect near the rear portion of a vehicle over a wide portion of the mirror surface on the bottom side portion of the reflecting mirror. As a result, it is possible to reduce the pressure that is placed on the vehicle compartment space without sacrificing visibility.

According to the aspect described above in (2), the mirror surface is formed having left-right symmetry in the vehicle width direction. Because of this, setting the curvature of the concavo-convex surface is simplified. In addition, the molding thereof is also simplified. Moreover, the problem of visual obscurity that is caused by left-right optical parallax can also be easily solved.

According to the aspect described above in (3), the bend in the concave surface in the substantially vertical direction of the reflecting mirror is more acute in the area on the lower side. In contrast, the bend in the concave surface in the substantially vertical direction of the reflecting mirror is less acute in the area on the upper side. As a result of this, in the lower portion area of the reflecting mirror which reflects the area adjacent to the rear of the vehicle, it is possible to enlarge the viewable range in the front-rear direction, and to thereby distinctly show the positional relationship between the vehicle body and an object adjacent to the vehicle body. Moreover, in the upper portion area of the reflecting mirror which reflects a comparatively distant area from the rear of the vehicle, it is possible to reflect a highly visible image that has minimal distortion in a vertical direction.

According to the aspect described above in (4), the radius of curvature of the concave surface in the substantially vertical direction of the reflecting mirror becomes smaller in a manner so as to approach the bottom portion area thereof from the top portion area thereof. As a result, it is possible to reduce distortion in a mirror image. At the same time, it is possible to prevent the appearance of an object which is approaching the vehicle at a constant speed from sharply changing.

Furthermore, according to the aspect described above in (4), the curvature of the mirror surface gradually changes. As a result of this, any concentration of light can be prevented.

Accordingly, according to the aspect described above in (4), visibility can be improved even more.

According to the aspect described above in (5), the bend in the convex surface in the substantially horizontal direction of the reflecting mirror is less acute in the area on the lower side, and more acute in the area on the upper side. As a result of this, in the lower portion area of the reflecting mirror which reflects an area adjacent to the rear of the vehicle, it is possible to reflect an image that has minimal distortion in the vehicle width direction.

In particular, in the upper portion area of the reflecting mirror which reflects a comparatively distant area from the rear of the vehicle, the length of the mirror surface in the vehicle width direction is shortened. According to the aspect described above in (5), by increasing, by the convex surface, the scale ratio of the mirror image of that portion where the length of the reflecting mirror in the vehicle width direction has been shortened, it is possible to compensate for the shortening of the mirror surface in the vehicle width direction.

Accordingly, according to the aspect described above in (5), even in cases in which the vehicle is being reversed at a maximum steering angle such as when, for example, the vehicle is being reversed into a garage, the predicted range of motion of the vehicle can be reliably shown on the mirror surface.

According to the aspect described above in (6), the radius of curvature of the convex surface in the substantially horizontal direction of the reflecting mirror becomes larger in a manner so as to approach the bottom portion area from the top portion area. As a result, it is possible to reduce distortion in a mirror image. At the same time, it is possible to prevent the appearance of an object which is approaching the vehicle at a constant speed from sharply changing.

Furthermore, according to the aspect described above in (6), the curvature of the mirror surface gradually changes. As a result of this, any concentration of light can be prevented.

Accordingly, according to the aspect described above in (6), visibility can be improved even more.

According to the aspect described above in (7), the radius of curvature of the area adjacent to the bottom end of the concave surface in the substantially vertical direction of the reflecting mirror becomes sharply smaller compared to the radius of curvature of the other areas. As a result of this, an image showing near the driver's vehicle, which is necessary in order for the driver to ascertain the relative positions between an object and driver's vehicle, can be reliably reflected in a narrow range. Moreover, this also allows an image showing other objects behind the vehicle to be reflected over a wide range in the remaining portion of the mirror surface.

According to the aspect described above in (8), an area adjacent to the bottom end of the concave surface in the substantially vertical direction of the reflecting mirror reflects a rear end portion of the vehicle. As a result of this, the vehicle occupant is able to reliably ascertain the position of an object relative to the vehicle without this leading to any increase in the size of the reflecting mirror.

According to the aspect described above in (9) through (13), the curvature of the reflecting mirror is set such that the radius of curvature of the area on the one end side in the vehicle width direction, which is closer to the driver's seat, is smaller than the radius of curvature of the area on the other end side in the vehicle width direction. In addition, any difference between the appearance of objects on the left-hand side and the appearance of objects on the right-hand side that is caused by the difference in the distance from the viewing point of the driver to the reflection positions on the mirror surface is canceled out by the variation in the scale ratio that is created by the curvature of the reflecting mirror. As a result of this, it is possible to reduce the differences between the way an object which is located in a lower area behind the vehicle appears when it is on the right-hand side in the vehicle width direction and the way it appears when it is on the left-hand side in the vehicle width direction. Accordingly, according to the aspect described above in (9) through (13), the driver is able to rapidly and accurately ascertain the situation in the lower area behind a vehicle.

According to the aspect described above in (14), the curvature of the reflecting mirror is set such that the radius of curvature becomes gradually larger in a manner so as to approach the other end side in the vehicle width direction from said one end side in the vehicle width direction, which is closer to the driver's seat. As a result, irrespective of where in the vehicle width direction objects that are present in the lower area behind the vehicle body are located, variations in how those objects appear can be reduced. Furthermore, the curvature is set such that any changes in the radius of curvature are not sharp changes. As a result of this, it is possible to reduce distortion in mirror images, and to improve visibility.

According to the aspect described above in (15), the curvature of the reflecting mirror is set such that objects of the same size that are the same distance from the center of the vehicle width direction are reflected as images of the same size in both the area on the one end side in the vehicle width direction, which area is closer to the driver's seat, and the area on the other end side in the vehicle width direction. As a result of this, a driver is able to accurately ascertain the size of an object, as well as the position thereof.

According to the aspect described above in (16), the reflecting mirror is placed in the center position in the vehicle width direction which protrudes the furthest towards the rear of the vehicle body. As a result of this, the visibility of the lower area behind the vehicle body can be improved even more.

DETAILED DESCRIPTION OF THE PREFERRED EMBODIMENTS

Hereinafter, an embodiment of the present invention will be described based on the drawings.

Figure 1:
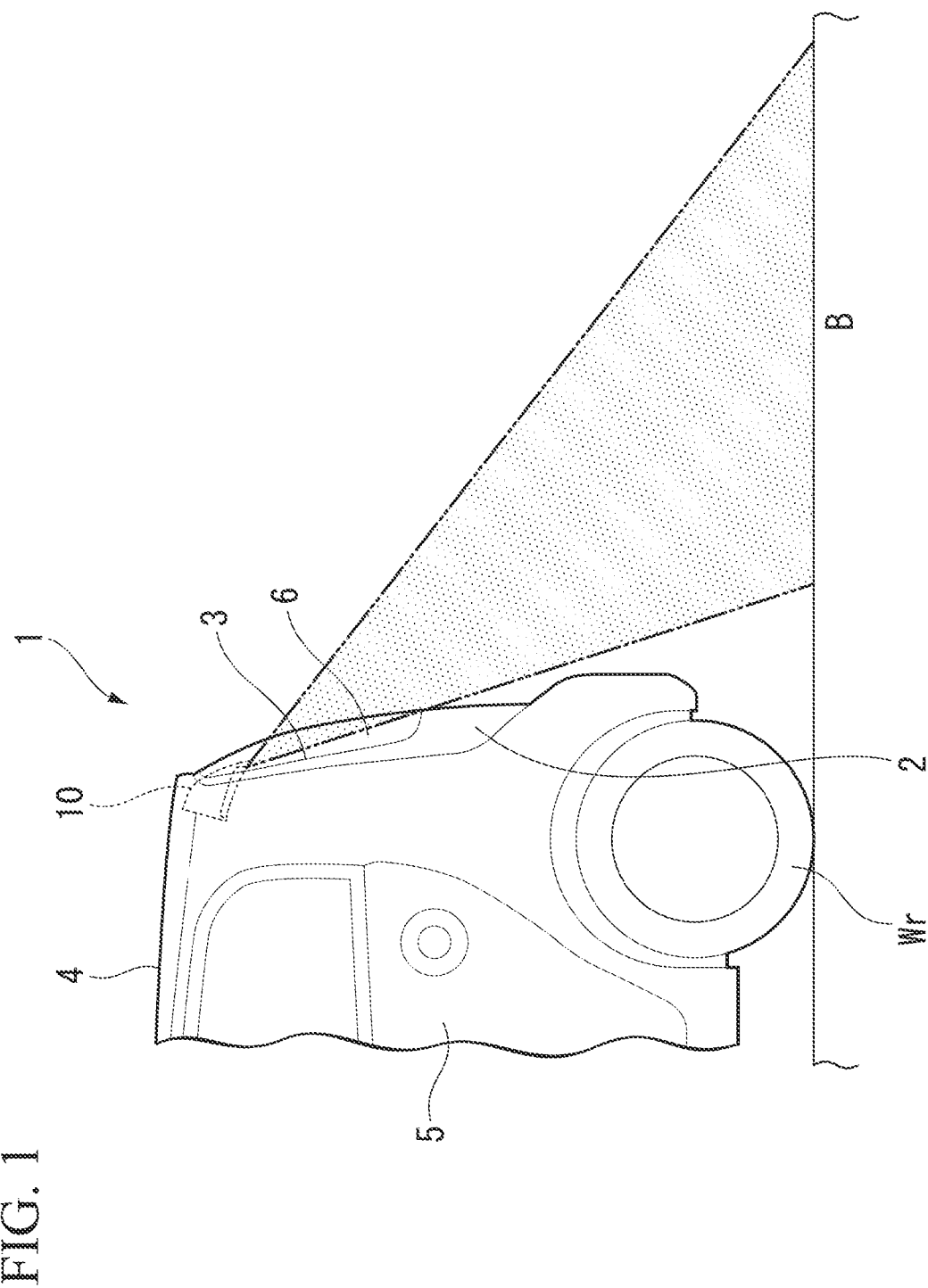
FIG. 1 is a side view showing a rear portion of a vehicle in which a rear under mirror according to a first embodiment of the present invention has been employed.

FIG. 1 is a view showing a side surface of a rear portion of a vehicle 1, which is a minivan-type of vehicle and is provided with a hatchback door 2 (i.e., tailgate). The reference numeral 3 in the drawing indicates a rear window which is provided above the backdoor 2. The reference numeral 4 indicates a roof panel of the vehicle. The reference numeral 5 indicates a side door at the rear portion of the vehicle. The reference numeral Wr indicates a rear wheel. A rear window glass 6 is mounted in the rear window 3.

Figure 2:
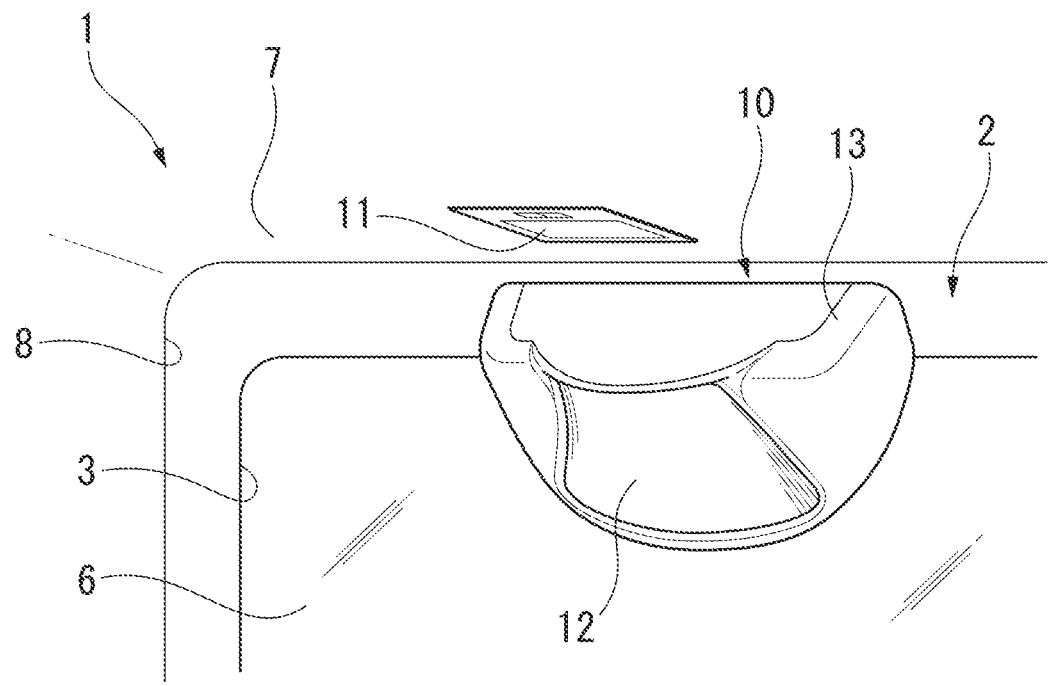
FIG. 2 is a perspective view showing a rear portion of a vehicle compartment interior in which the rear under mirror according to the same embodiment has been employed.

FIG. 2 is a view showing the backdoor 2 as seen from the vehicle compartment interior. The reference numeral 7 in the drawing indicates a ceiling portion inside the vehicle compartment. The reference numeral 8 indicates a door aperture portion of the vehicle body which is opened and closed by the backdoor 2. The reference numeral 11 indicates an interior light which is fitted in the ceiling portion 7 of the vehicle compartment interior.

The backdoor 2 is mounted on a rear end portion of left and right side edges of the roof panel 4 such that it is able to pivot freely via door hinges (not shown). The backdoor 2 is curved outwards such that a central portion thereof in the vehicle width direction protrudes outwards (i.e., towards the rear of the vehicle) the most. A top edge portion of the back door 2 curves upwards and towards the front such that a top end portion of the backdoor 2 is smoothly continuous with the roof panel 4. A rear under mirror 10 which reflects an area at the bottom rear of the vehicle 1 (i.e., the area indicated by B in FIG. 1) towards an occupant of the vehicle compartment interior is installed in a top edge portion of the back door 2 on the vehicle compartment interior side thereof and adjacent to a top side of the rear window 3 (i.e., the rear window glass 6). The rear under mirror 10 is mounted in a central position in the vehicle width direction of the back door 2 (i.e., in a central position in the width direction of the vehicle 1).

Figure 3:
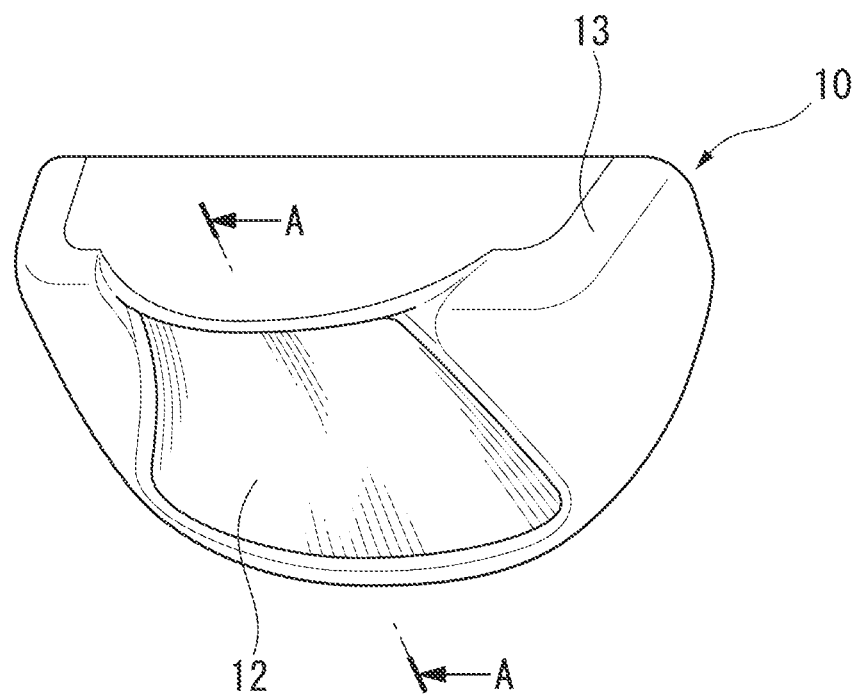
FIG. 3 is a perspective view showing the rear under mirror according to the same embodiment.

FIG. 3 is a perspective view showing the rear under mirror 10. The rear under mirror 10 is provided with a reflecting mirror 12 which reflects a lower area behind the vehicle through the rear window glass 6, a housing 13 which is made from resin and directly holds the reflecting mirror 12, and a base plate (not shown) which is directly fastened to the top edge portion of the back door 2 and to which the housing 13 is ultimately attached by screws or the like. In the case of the present embodiment, a high-mount stop lamp unit (not shown) is incorporated integrally with the rear under mirror 10. The high-mount stop lamp is mounted on the base plate such that the lantern face thereof faces towards the surface of the rear window glass 6 that is on the vehicle compartment interior side.

The reflecting mirror 12 contains a concavo-convex mirror that has a mirror surface that is concave in a substantially vertical direction and convex in a substantially horizontal direction. In the case of the present embodiment, the shape of the mirror surface of the reflecting mirror 12 is formed by cutting the three-dimensionally curved concavo-convex surface in a trapezoidal shape whose bottom side is longer than top side thereof. Accordingly, when viewed from the front, the reflecting mirror 12 has a trapezoidal shape whose bottom side is longer than top side thereof. In addition, the reflecting mirror 12 is installed on the back door 2 via the base plate and the housing 13 such that, when the back door 2 is closed, the bottom end of the mirror surface slopes downwards and towards the rear of the vehicle body. If the reflecting mirror 12 is installed in this manner, it is able to reflect a wide range of the lower area behind the vehicle as an erect image. In addition, the occupant seated in the driver's seat (i.e., the driver) is able to see this erect image. According to the reflecting mirror 12, the lower area behind the vehicle is reflected over a wide angle in the vehicle width direction by the surface of the concavo-convex mirror which is convex in a substantially horizontal direction. Moreover, by using this reflecting mirror 12, the image reflected in the mirror surface is changed by the mirror surface which is concave in a substantially vertical direction into an erect image which can be easily ascertained by the driver.

Here, the radius of curvature of the concave surface side and the radius of curvature of the convex surface side of the reflecting mirror 12 are not the same in the vertical direction. These radii of curvature are each set in the manner described below.

Figure 4:
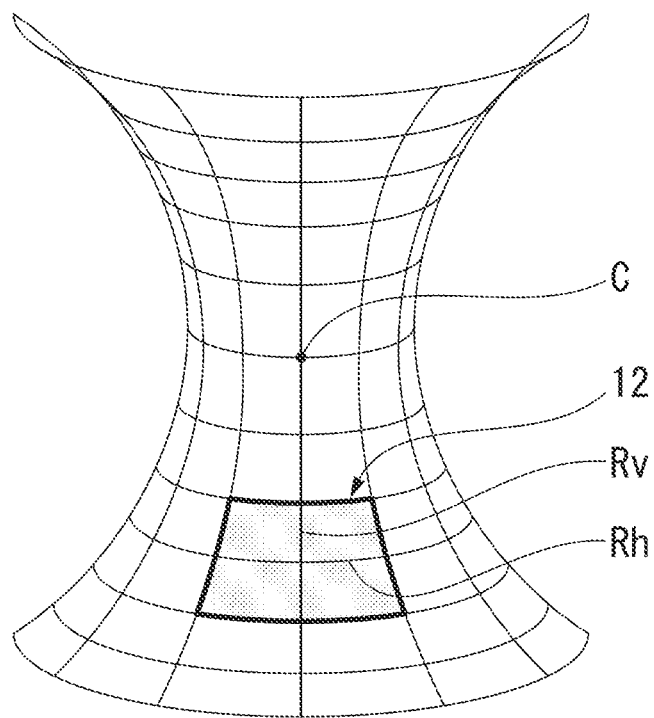
FIG. 4 is a schematic view showing the setting of a radius of curvature and shape of a reflective surface of the rear under mirror according to the same embodiment.
Figure 5:
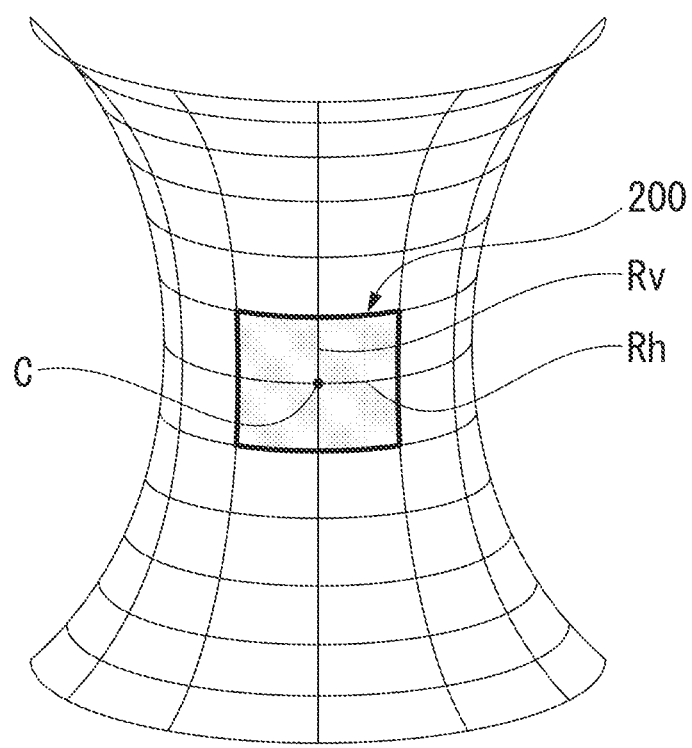
FIG. 5 is a schematic view showing the setting of the radius of curvature and shape of a reflective surface according to a comparative example.

FIG. 4 is a schematic view showing the setting of a radius of curvature and shape of the reflecting mirror 12 of the rear under mirror 10 according to the present embodiment. FIG. 5 is a schematic view showing the setting of the radius of curvature and shape of a reflecting mirror 200 according to a comparative example.

In the reflecting mirror 200 according to the comparative example, which is shown in FIG. 5, a radius of curvature Rv of a substantially concave surface in a vertical direction is set as constant. The mirror surface of the reflecting mirror 200 is cut into substantially square shape which is centered on a reference point c (i.e., a central position in a vertical direction) of the concavo-convex curved surface.

In contrast to this, in the case of the reflecting mirror 12 according to the present embodiment, which is shown in FIG. 4, the radius of curvature Rv of a substantially concave surface in a vertical direction is set such that, compared to the area in the upper portion the area in the lower portion is smaller. Namely, the bend of the concave surface in a substantially vertical direction of the reflecting mirror 12 becomes more acute the closer it comes to the bottom portion area. In addition, the mirror surface of the reflecting mirror 12 is not cut into a substantially square shape which is centered on the reference point c. Instead, the mirror surface of the reflecting mirror 12 is cut from a portion below the reference point c in a trapezoidal shape which has left-right symmetry and in which the length of the bottom side of the trapezoid is longer than the length of the top side thereof.

Moreover, in the case of the reflecting mirror 12 according to the present embodiment, the radius of curvature Rv of the concave surface side of the mirror surface gradually changes in a manner so as to approach the area of the bottom portion from the area of the top portion. However, in the area in the bottommost portion, as described below, the radius of curvature Rv changes more sharply compared to the other portions. This change in the radius of curvature of the mirror surface is set to a cross-section of the mirror surface does not describe a parabola.

Moreover, a radius of curvature Rh of the convex surface in a substantially horizontal direction is substantially the same within one transect of the substantially horizontal direction for both the reflecting mirror 12 (FIG. 4) of the present embodiment, and the reflecting mirror 200 (FIG. 5) of the comparative example.

However, in the reflecting mirror 200 of the comparative example, which is shown in FIG. 5, the radius of curvature Rh of the convex surface in a substantially horizontal direction, which is located in the center of a substantially vertical direction that passes through the reference point c, is the smallest radius of curvature. As the radius of curvature Rh of the convex surface in a substantially horizontal direction shifts away from the reference point c either upwards or downwards, it becomes larger.

In contrast to this, in the case of the reflecting mirror 12 according to the present embodiment, which is shown in FIG. 4, the radius of curvature Rh of the convex surface in a substantially horizontal direction becomes gradually larger in a manner so as to approach the area of the bottom portion from the area of the top portion. Namely, the bend of the convex surface in a substantially horizontal direction of the reflecting mirror 12 becomes less acute the closer it comes to the bottom portion area.

Figure 6A:
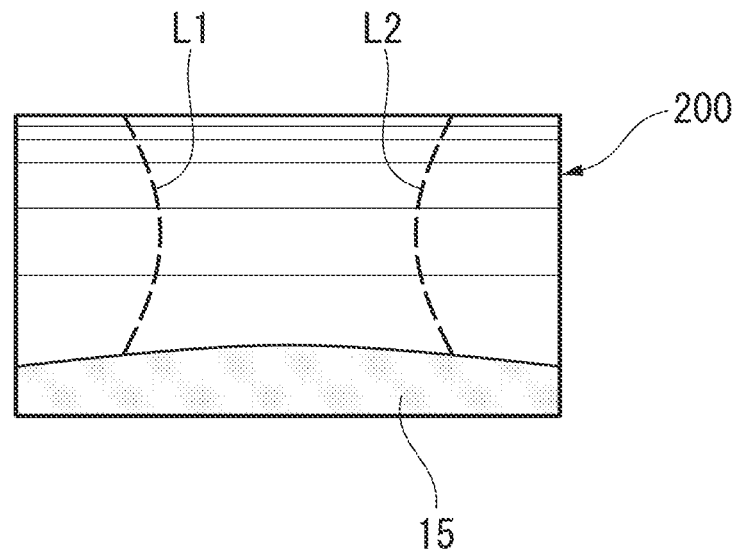
FIG. 6A shows an image that appears through a reflecting mirror according to a comparative example.
Figure 6B:
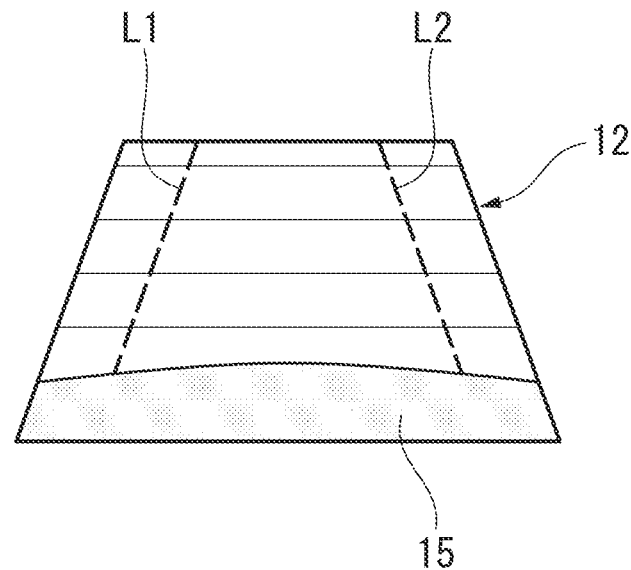
FIG. 6B shows an image that appears through a reflecting mirror of the rear under mirror according to the first embodiment of the present invention.

FIGS. 6A and 6B are views showing a comparison of the visible results when the radius of curvature Rh of the convex surface in a substantially horizontal direction of the reflecting mirror 12 changes as it goes from the area of the top portion of the reflecting mirror 12 towards the area of the bottom portion thereof. FIG. 6A shows the appearance of two mutually parallel straight lines L1 and L2 which extend rearwards from the vehicle when these are shown in the reflecting mirror 200 according to the comparative example. FIG. 6B shows the appearance of the same two mutually parallel straight lines L1 and L2 when these are reflected in the reflecting mirror 12 according to the present embodiment. the reference numeral 15 in FIGS. 6A and 6B indicates a rear portion of the vehicle body such as a rear bumper which appears in the mirror surface.

In the case of the reflecting mirror 200 according to the comparative example, which is shown in FIG. 6A, the mirror surface of the reflecting mirror 200 is cut in a substantially square shape which is centered on the reference point c of the concavo-convex curved surface. As the radius of curvature of the convex portion in a substantially horizontal direction from the reference point c to either upwards or downwards, it becomes larger. Because of this, the straight lines L1 and L2 appear to be distorted inwards near their center portions. As a result, a vehicle occupant who is looking in the reflecting mirror 200 may become confused by such an image.

In contrast to this, in the case of the reflecting mirror 12 according to the present embodiment, which is shown in FIG. 6B, the shape of the mirror surface of the reflecting mirror 12 is cut from a portion below the reference point c of the concavo-convex curved surface in a trapezoidal shape which has left-right symmetry, and in which the length of the bottom side of the trapezoid is longer than the length of the top side thereof. The convex surface in a substantially horizontal direction is set to the radius of curvature Rh become gradually larger (i.e., such that the bend becomes gradually less acute) in the direction from the top side towards the bottom side. Because of this, the scale ratio of the mirror image in a substantially horizontal direction which is formed by the mirror surface on the top side becomes larger. Accordingly, the two straight lines L1 and L2 that are reflected in the mirror surface of the reflecting mirror 12 are corrected so as to appear straight in the direction from the side nearest the vehicle into the distance. This reflecting mirror 12 does not provide any confusing images that are caused by distortion in the depth direction to a vehicle occupant who is looking in the reflecting mirror 12.

Figure 7A:
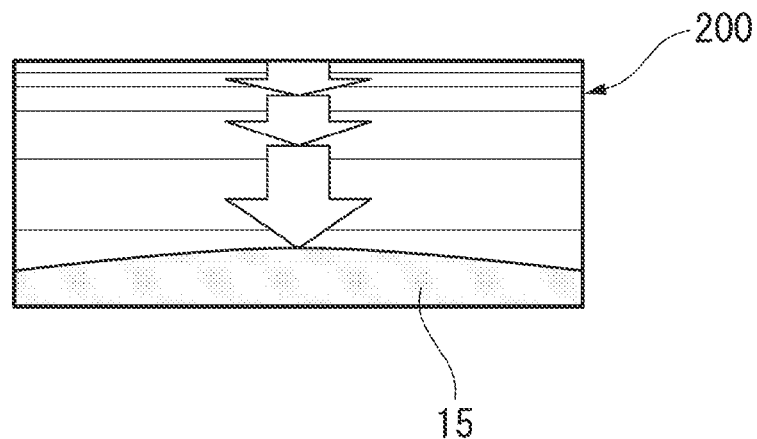
FIG. 7A shows a moving image of an object through a reflecting mirror according to a comparative example.
Figure 7B:
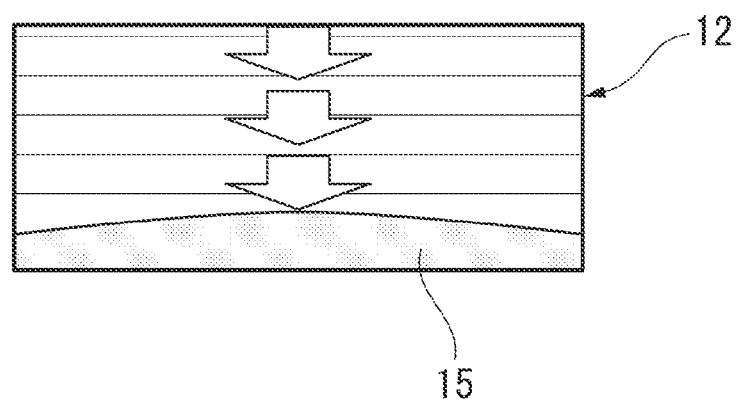
FIG. 7B shows a moving image of an object through a reflecting mirror of the rear under mirror according to the first embodiment of the present invention.

FIGS. 7A and 7B are views showing a comparison of the visible results when the radius of curvature Rv of the concave surface in a substantially vertical direction of the reflecting mirror 12 is changed. FIG. 7A uses arrows to show an image of the speed of movement of an object that appears on the reflecting mirror 200 of the comparative example when, during a reversing movement by the vehicle, the rear portion of the vehicle approaches the object at a constant speed. FIG. 7B uses the same type of arrows to show an image of the speed of movement of an object that appears on the reflecting mirror 12 of the present embodiment when, during a reversing movement by the vehicle, the rear portion of the vehicle approaches the object at a constant speed. in the drawings, the size of the arrows increases as the movement speed of the object reflected in the mirror surface becomes faster.

In the case of the reflecting mirror 200 of the comparative example, which is shown in FIG. 7A, the concave surface in a substantially vertical direction of the reflecting mirror 200 has a substantially constant radius of curvature. Because of this, the approach speed of the object appears to increase as the vehicle approaches the object. As a result, a vehicle occupant who is looking in the reflecting mirror 200 may become confused by such an image.

In contrast to this, in the case of the reflecting mirror 12 according to the present embodiment, which is shown in FIG. 7B, the concave surface in a substantially vertical direction of the reflecting mirror 12 is set to the radius of curvature Rv becomes gradually smaller (i.e., such that the bend becomes gradually more acute) in a manner so as to approach the bottom portion area thereof from the top portion area thereof. Because of this, the scale ratio in a substantially vertical direction which is created by the mirror surface on the lower side becomes larger. Accordingly, the object reflected in the mirror surface of the reflecting mirror 12 is corrected such that it appears to approach at a constant speed. In the case of this reflecting mirror 12, no confusing images that are caused by changes in the movement speed of an object are shown to a vehicle occupant who is looking in the reflecting mirror 12.

Figure 8:
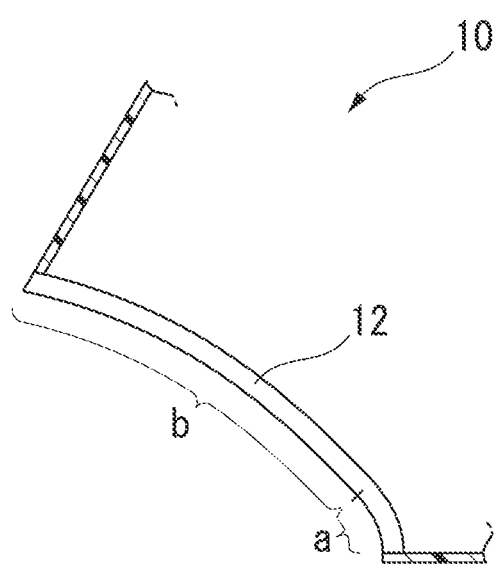
FIG. 8 is a cross-sectional view corresponding to a cross-section A-A in FIG. 3 of the rear under mirror according to the first embodiment of the present invention.

FIG. 8 shows a cross-section in a substantially vertical direction of the reflecting mirror 12 that corresponds to the cross-section A-A shown in FIG. 3. An acute bend area in which the radius of curvature of the concave surface in a substantially vertical direction is smaller compared to the remaining area is provided in an area a adjacent to the bottom end of the reflecting mirror 12. Accordingly, as described above, the radius of curvature Rv of the concave surface in a substantially vertical direction of the mirror surface of the reflecting mirror 12 is set to the radius of curvature Rv of the acute bend area is smaller than in the remaining area. Namely, the area a adjacent to the bottom end of the reflecting mirror 12 is set to the radius of curvature Rv thereof is smaller compared to the remaining area b. The area a where the radius of curvature Rv adjacent to the bottom end is smaller than in the remaining area is set such that, when an occupant of the driver's seat looks in the reflecting mirror 12, even if the view point of the vehicle occupant differs slightly, the rear portion 15 of the vehicle body is reliably reflected in the area a.

Figure 9A:
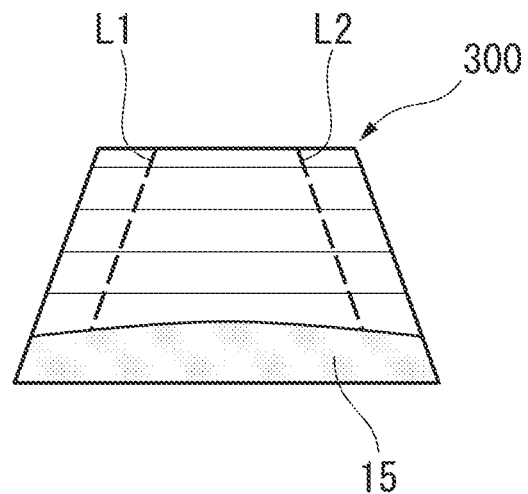
FIG. 9A shows an image that appears through a reflecting mirror according to a comparative example.
Figure 9B:
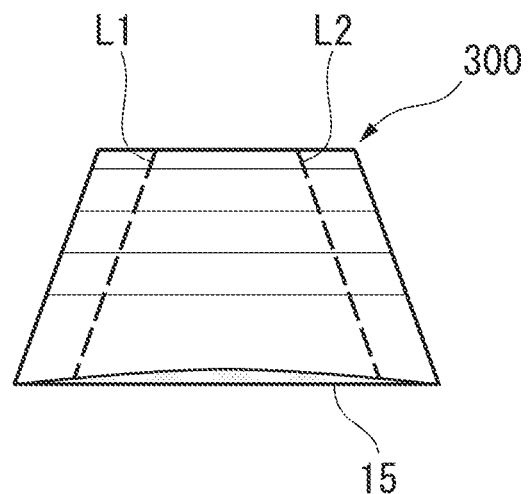
FIG. 9B shows an image that appears through a reflecting mirror according to a comparative example.
Figure 9C:
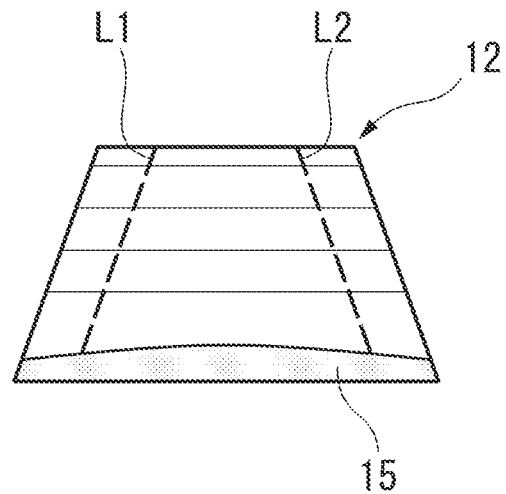
FIG. 9C shows an image that appears through a reflecting mirror of the rear under mirror according to the first embodiment of the present invention.
Figure 9D:
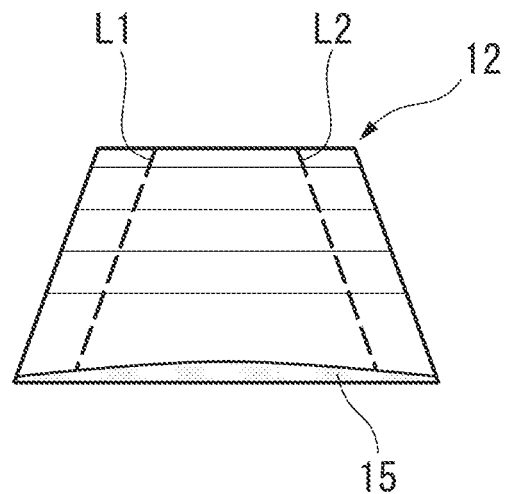
FIG. 9D shows an image that appears through a reflecting mirror of the rear under mirror according to the first embodiment of the present invention.

FIGS. 9A, 9B, 9C, and 9D show a comparison of the visible results when the radius of curvature Rv of the area a adjacent to the bottom end of the reflecting mirror 12 is sharply reduced. FIG. 9A shows the appearance when a vehicle occupant sitting at a low seat height looks at a reflecting mirror 300 according to a comparative example in which the radius of curvature Rv of the area a adjacent to the bottom end of the mirror surface is not sharply reduced. FIG. 9B shows the appearance when a vehicle occupant sitting at a high seat height looks at the same reflecting mirror 300. FIG. 9C shows the appearance when a vehicle occupant sitting at a low seat height looks at the reflecting mirror 12 according to the present embodiment in which the radius of curvature Rv of the area a adjacent to the bottom end of the mirror surface is sharply reduced. FIG. 9D shows the appearance when a vehicle occupant sitting at a high seat height looks at the same reflecting mirror 12.

As shown in FIG. 9A, when a vehicle occupant sitting at a low seat height looks at the reflecting mirror 300, a large area of the rear portion 15 of the vehicle body is reflected within the mirror surface of the reflecting mirror 300. Because of this, in order to reliably reflect the rear portion 15 of the vehicle body within the mirror surface, it is necessary to either sacrifice those more distant portions from the rear portion of the vehicle body that are reflected, or to extend the length in the vertical direction of the actual mirror surface itself. Moreover, as shown in FIG. 9B, when a vehicle occupant sitting at a high seat height looks at the reflecting mirror 300, a small area of the rear portion 15 of the vehicle body is reflected within the mirror surface of the reflecting mirror 300. Because of this, it is difficult to ascertain the positional relationship and sense of distance between the rear portion 15 of the vehicle body and an object that appears within the mirror surface.

In contrast to this, in the case of the reflecting mirror 12 of the present embodiment, which is shown in FIGS. 9C and 9D, the radius of curvature Rv of the area a adjacent to the bottom end of the mirror surface is sharply reduced. Moreover, the scale ratio in a vertical direction in the area adjacent to the bottom end of the mirror surface increases. Because of this, it is possible for a wide area in the vertical direction to be reflected in this area. Even if the height of the view point of the occupant of the driver's seat changes, there is no great change in the amount of the rear portion 15 of the vehicle body that is reflected in the mirror surface (i.e., the reflection amount). Accordingly, in the case of this reflecting mirror 12, the size of the reflection from more distant positions from the rear portion of the vehicle is reduced, and yet there is no need to extend the length in the vertical direction of the mirror surface itself. The rear portion 15 of the vehicle body can be reliably reflected in the mirror surface irrespective of any variance in the height of the view point of the vehicle occupant.

As described above, in the rear under mirror 10 according to the present embodiment, the reflecting mirror 12 which is formed by a concavo-convex mirror surface is formed in a trapezoidal shape in which the bottom side of the trapezoid is longer than the top side thereof when it is viewed from the front. Because of this, at the same time as the space in the front-rear direction of the vehicle that is occupied by the top side portion of the reflecting mirror 12 is made smaller, it is possible to secure a sufficiently wide reflection area on the bottom side of the reflecting mirror 12 which reflects near the area behind the vehicle.

Namely, in the case of the rear under mirror 10, the top side of the reflecting mirror 12 is shorter than the bottom side thereof. In addition, the arc of the convex surface in a substantially vertical direction is also made smaller. Because of this, the length in the vehicle front-rear direction that is occupied by the upper side portion of the reflecting mirror 12 is shortened. As a result of this, the amount that the top portion area of the rear under mirror 10 protrudes into the vehicle compartment is reduced.

In contrast, because the bottom side of the reflecting mirror 12 is longer than the top side thereof, a sufficiently wide reflection area on the bottom side can be secured. On the bottom side, because the arc of the convex surface in a substantially horizontal direction of the reflecting mirror 12 is longer, the length that it occupies in the front-rear direction of the vehicle does become longer. However, the rear window glass 6 that is located behind the rear under mirror 10 slopes diagonally towards the rear of the vehicle in a manner so as to approach the bottom portion area. Because of this, the increase in the space in the vehicle front-rear direction occupied by the bottom portion area of the rear under mirror 10 is permitted by this slope of the rear window glass 6. Accordingly, the amount that the bottom portion area of the rear under mirror 10 protrudes into the vehicle compartment does not increase to an unacceptable degree.

In particular, in a rear under mirror 10 that has a high-mount stop lamp unit built into the same housing 13, as in the present embodiment, there is a tendency for the overall dimensions of the rear under mirror to increase and thereby put pressure on the space inside the vehicle compartment. However, in the present embodiment, it is possible to effectively reduce the pressure placed on the space inside the vehicle compartment without causing the visibility to deteriorate.

Because the rear under mirror 10 is formed in a trapezoidal shape in which the mirror surface of the reflecting mirror 12 has left-right symmetry, the advantages are obtained that setting the curvature of the concavo-convex surface is easy, and the molding thereof is also simplified.

Moreover, because the mirror surface of the reflecting mirror 12 has left-right symmetry, it is possible to easily solve the problem of visual obscurity that is caused by left-right optical parallax, which is a particular problem with concavo-convex mirrors.

In the rear under mirror 10 according to the present embodiment, the radius of curvature Rv of the concave surface of the lower portion area of the reflecting mirror 12 is set smaller than the radius of curvature Rv of the concave surface of the upper portion area thereof. Because of this, in the lower portion area of the reflecting mirror 12 which reflects near the rear portion of the vehicle, it is possible to enlarge the viewable range in the front-rear direction by a large scale ratio. As a result of this, it is possible to distinctly show the positional relationship between the vehicle body and an object adjacent to the vehicle body. Moreover, in the upper portion area of the reflecting mirror 12 which reflects a comparatively distant area from the rear of the vehicle, it is possible to reflect a highly visible image that has minimal distortion in a vertical direction.

Moreover, in this rear under mirror 10, the radius of curvature Rv of the concave surface of the reflecting mirror 12 is set to it becomes smaller in a manner so as to approach the bottom portion area thereof from the top portion area thereof. Because of this, it is possible to reduce the distortion of an object reflected in the reflecting mirror 12. When the vehicle is approaching an object at a constant speed, as described above, it is possible to prevent the speed at which the object is being approached from appearing to sharply change.

Furthermore, in this rear under mirror 10, the radius of curvature Rh of the convex surface of the lower portion area of the reflecting mirror 12 is set larger than the radius of curvature Rh of the convex surface of the upper portion area thereof. Because of this, in the lower portion area of the reflecting mirror 12 which reflects near the rear portion of the vehicle, it is possible to reflect a highly visible image that has minimal distortion in the vehicle width direction. Moreover, in the upper portion area of the reflecting mirror 12 which reflects an area that is comparatively distant from the rear of the vehicle, it is possible to reflect a wide range in the vehicle width direction by a large scale ratio.

In this rear under mirror 10, the length in the vehicle width direction of the mirror surface in the upper portion area of the reflecting mirror 12 is shorter than the length in the vehicle width direction of the mirror surface in the lower portion area thereof. However, the scale ratio of the upper portion area is set to a high level. Because of this, a distant area at the rear of the vehicle can be reflected over a wide angle in the vehicle width direction. Accordingly, by using this rear under mirror 10, even in cases in which the vehicle is being reversed at a maximum steering angle such as when, for example, the vehicle is being reversed into a garage, the predicted range of motion of the vehicle can be reliably reflected on the mirror surface.

Moreover, in this rear under mirror 10, the radius of curvature Rh of the convex surface of the reflecting mirror 12 is set such that it increases in a manner so as to approach the bottom portion area thereof from the top portion area thereof. Because of this, it is possible to reduce any distortion in the object reflected in the reflecting mirror 12, in particular, any distortion of a straight line which extends rearwards from the vehicle, so that visibility is improved.

Furthermore, according to this rear under mirror 10, the cross-section of the mirror surface of the reflecting mirror 12 (i.e., the cross-section of the convex portion in a substantially horizontal direction and of the concave portion in a vertical direction) is set so as to describe a gradually changing curve that is not a parabola. As a result, the advantages are obtained that any concentration of light can be prevented, and viewing the mirror surface can be made even easier.

Moreover, the rear under mirror 10 according to the present embodiment is provided with the bend area a in an area adjacent to the bottom end of the reflecting mirror 12 where the radius of curvature Rv of the concave surface in a substantially vertical direction is smaller than the radius of curvature Rv in the remaining area. As a result, it is possible to reliably reflect an image showing near the rear portion of the vehicle over a narrow range in the bottom end side of the mirror surface, and this allows an image showing the area which is more distant from the rear of the vehicle to be reflected over a wide range in the remaining portion of the mirror surface. Accordingly, it is possible to increase the front-rear range that is shown on the mirror surface while restricting the height of the reflecting mirror 12 in a vertical direction to a minimum.

In particular, in the case of the rear under mirror 10 according to the present embodiment, irrespective of any variance in the height of the view point of the vehicle occupant, the rear portion 15 of the vehicle body is always shown in the bend area a. Because of this, the vehicle occupant is able to reliably ascertain the position of an object relative to the rear portion 15 of the vehicle body without this leading to any increase in the size of the reflecting mirror 12.

Figure 10:
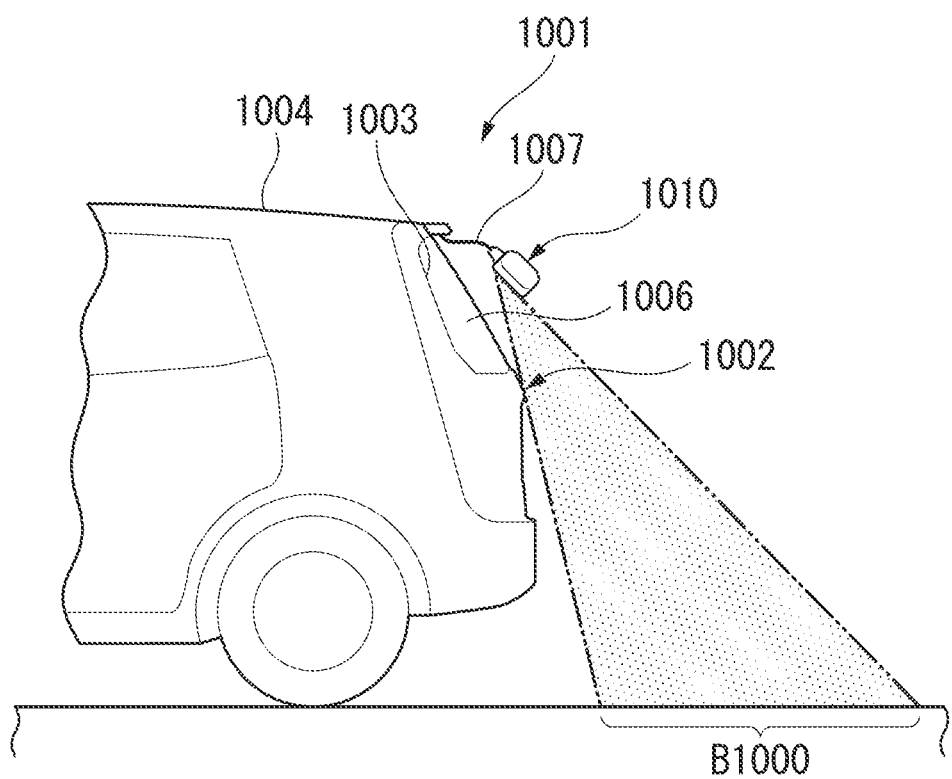
FIG. 10 is a side view showing a rear portion of the vehicle in which a rear under mirror according to a second embodiment of the present invention has been employed.

Hereinafter, a second embodiment of the present invention will be described based on the drawings. Firstly, the second embodiment shown in FIGS. 10 through 14 will be described. FIG. 10 is a view showing a side surface of a rear portion of a vehicle 1001 which is a minivan-type of vehicle and is provided with a hatchback door 1002 (i.e., tailgate). The reference numeral 1003 in the drawing indicates a rear window which is provided above the backdoor 1002. The reference numeral 1004 indicates a roof panel of the vehicle. The reference numeral 1006 indicates a rear window glass which is mounted in the rear window 1003.

Figure 11:
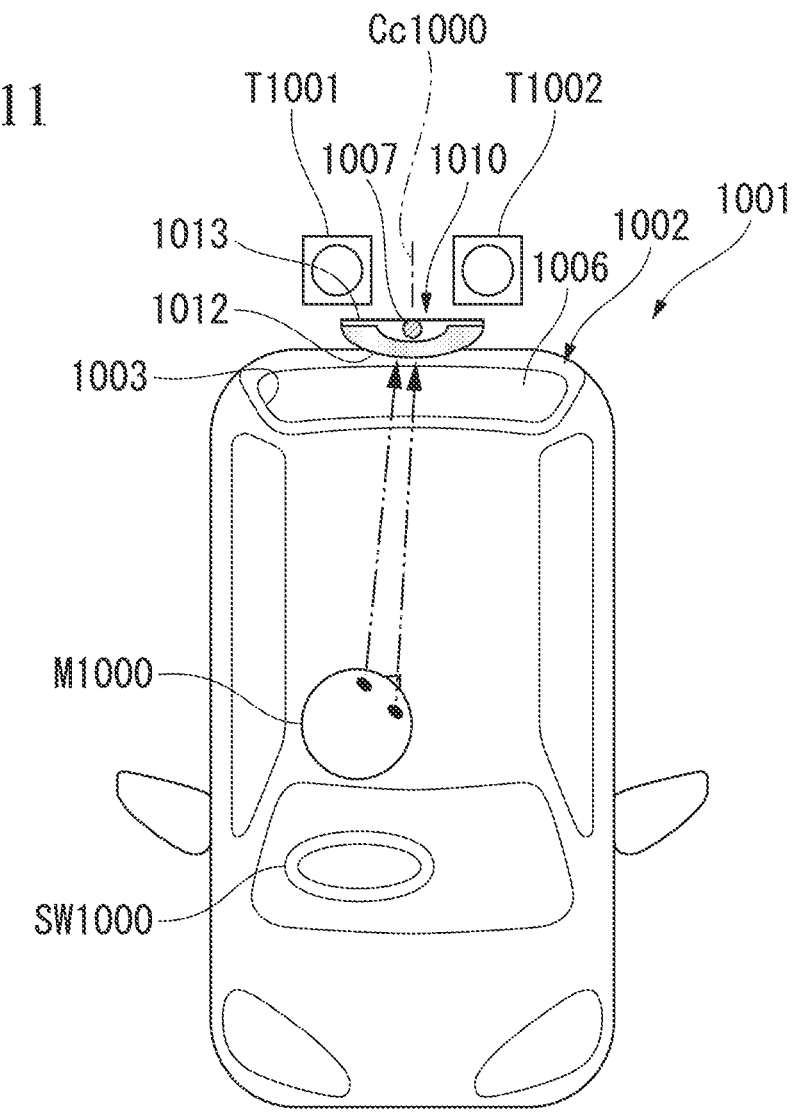
FIG. 11 is a schematic view showing a vehicle in which the rear under mirror according to the second embodiment of the present invention has been employed.

FIG. 11 is a schematic plan view showing the vehicle 1001. The reference numeral SW1000 indicates the steering wheel on the driver's side, while M1000 is a vehicle occupant seated in the driver's seat. The vehicle 1001 according to the present embodiment is a right-hand drive vehicle in which the driver's seat (i.e., the steering wheel SW1000) is on the right-hand side in the direction of forward travel. The reference numerals T1001 and T1002 in FIG. 11 indicate marker objects such as cones or the like that have been placed on the road. These marker objects T1001 and T1002 have the same shape and the same size.

The backdoor 1002 is mounted on a rear end portion of left and right side edges of the roof panel 1004 such that it is able to open and close via door hinges (not shown). The backdoor 1002 is curved outwards such that a central portion thereof in the vehicle width direction protrudes outwards (i.e., towards the rear of the vehicle) the most. A top edge portion of the back door 1002 curves upwards and towards the front such that a top end portion of the backdoor 1002 is smoothly continuous with the roof panel 1004. A rear under mirror 1010 which reflects a lower area behind the vehicle 1001 (i.e., the area indicated by B1000 in FIG. 10) towards the vehicle occupant M1000 who is inside the vehicle compartment is mounted via a bracket 1007 on a top edge portion of the vehicle exterior side of the back door 1002 and adjacent to a top side of the rear window 1003 (i.e., the rear window glass 1006). The rear under mirror 1010 of the present embodiment is mounted in a central position in the vehicle width direction of the back door 1002 (i.e., in a central position in the width direction of the rear portion of the vehicle body).

Figure 12:
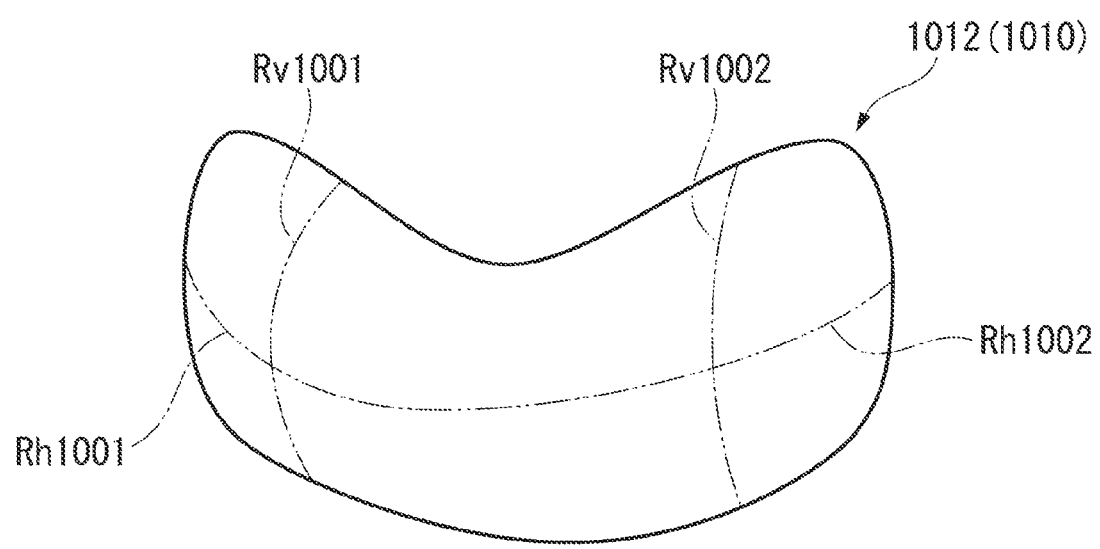
FIG. 12 is a schematic view showing a reflecting mirror of the rear under mirror according to the second embodiment of the present invention.
Figure 13:
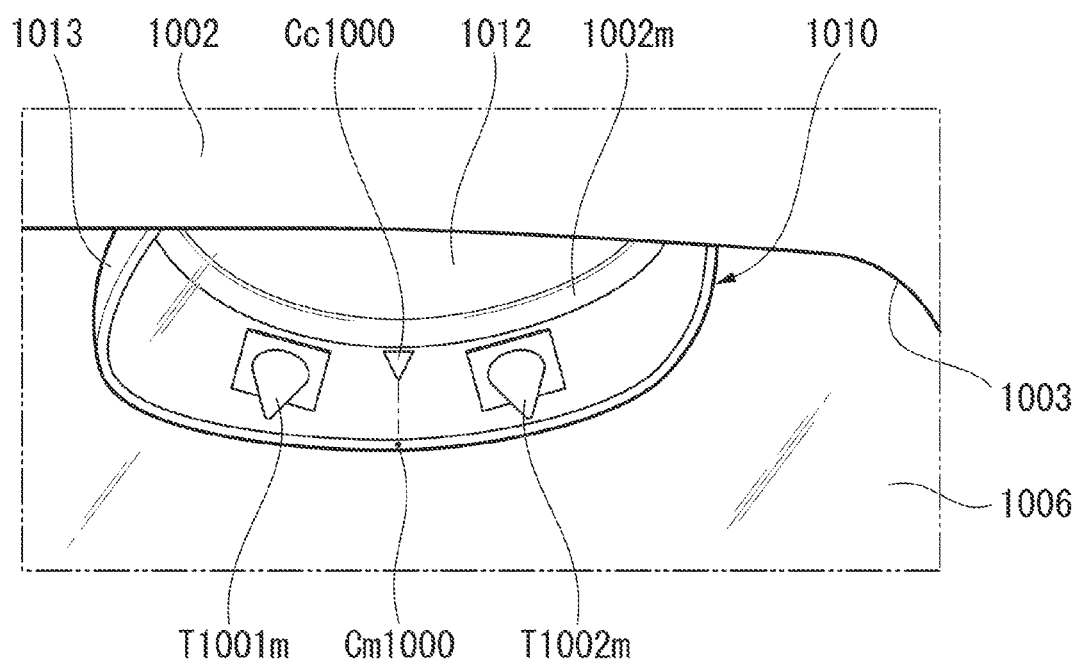
FIG. 13 is a view showing the rear under mirror according to the second embodiment of the present invention, and also an image which is shown on the mirror surface thereof.

FIGS. 12 and 13 show the rear under mirror 1010.

The rear under mirror 1010 is provided with a reflecting mirror 1012, and with a holder 1013 (see FIGS. 11 and 13) which holds the reflecting mirror 1012. The bracket 1007 (see FIG. 10) is joined to the holder 1013. in FIG. 12 the reflecting mirror 1012 is shown by itself, while in FIG. 13 an image (i.e., a mirror image) showing the lower area behind the vehicle which is reflected in the reflecting mirror 1012 is also shown together with the reflecting mirror 1012. The reference numeral 1002m in FIG. 13 indicates a mirror image of the backdoor 1002 which is reflected in the reflecting mirror 1012, while the reference numerals T1001m and T1002m are mirror images of the marker objects T1001 and T1002 which are also reflected in the reflecting mirror 1012.

The reflecting mirror 1012 according to the present embodiment is formed by a convex mirror that has convex mirror surfaces in both the vertical direction and the vehicle width direction.

The curvature in the vehicle width direction of the reflecting mirror 1012 does not have a uniform radius of curvature, and as shown in FIG. 12, a radius of curvature Rh1001 of an area on one end side (i.e., on the right-hand side of the vehicle) in the vehicle width direction, which is closer to the driver's seat (i.e., to the vehicle occupant M1000), is set smaller than a radius of curvature Rh1002 of an area on the other end side (i.e., on the left-hand side of the vehicle) in the vehicle width direction. In addition, the curvature in the vertical direction of the reflecting mirror 1012 does not have a uniform radius of curvature, and a radius of curvature Rv1001 of an area on one end side (i.e., on the right-hand side of the vehicle) in the vehicle width direction, which is closer to the driver's seat (i.e., to the vehicle occupant M1000), is set smaller than a radius of curvature Rv1002 of an area on the other end side (i.e., on the left-hand side of the vehicle) in the vehicle width direction.

In addition, both the radius of curvature in the vehicle width direction and the radius of curvature in the vertical direction of the reflecting mirror 1012 are set so as to become gradually larger in a manner so as to approach the other end side in the vehicle width direction from the one end side in the vehicle width direction, which is closer to the driver's seat.

When the occupant M1000 of the driver's seat turns around from a central position in the vehicle to look behind them (see FIG. 11), as shown in FIG. 13, the reflecting mirror 1012 is set such that a center Cm1000 in the width direction of the reflecting mirror 1012 matches a center Cc1000 in the vehicle width direction of the rear portion of the vehicle body (i.e., the backdoor 1002m) that is reflected in the reflecting mirror 1012.

As described above, in the rear under mirror 1010 according to the present embodiment, the curvature of the reflecting mirror 1012 is set such that the radii of curvature Rh1002 and Rv1002 of the area on the other end side in the vehicle width direction are set larger than the radii of curvature Rh1001 and Rv1001 of the area on the one end side in the vehicle width direction, which is closer to the driver's seat. Because of this, as seen in the reflecting mirror 1012, the scale ratio of the mirror image in the area on the one end side in the vehicle width direction is larger than the scale ratio of the mirror image in the area on the other end side in the vehicle width direction.

Figure 14:
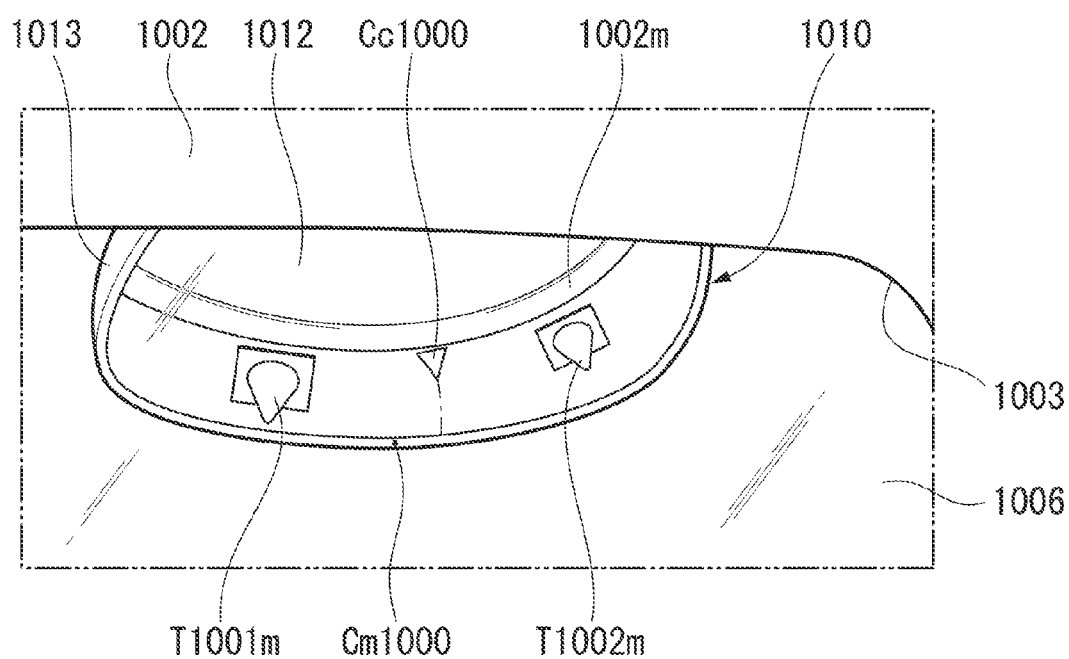
FIG. 14 is a view showing the rear under mirror according to a comparative example, and also an image which is shown on the mirror surface thereof.

FIG. 14 is a view showing the appearance of a mirror image of a comparative example in which the curvature of the reflecting mirror 1012 is set such that the radius of curvature of the area on the one end side in the vehicle width direction is the same as the radius of curvature of the area on the other end side in the vehicle width direction. As shown in FIG. 14, when the radius of curvature stays the same, because of the difference in the distances from the viewing point of the occupant of the driver's seat to the reflected positions on the mirror surface, even when objects have the same shape and the same size, the object on the right-hand side in the vehicle width direction (i.e., on the side nearest to the driver's seat) appears different from the object on the left-hand side (i.e., on the opposite side from the driver's seat). Specifically, a mirror image of an object which is on the right-hand side in the vehicle width direction, for example, the mirror image T1001m of the marker object T1001 appears larger than a mirror image of an object which is on the left-hand side in the vehicle width direction, for example, the mirror image T1002m of the marker object T1002.

In contrast to this, in the rear under mirror 1010 according to the present embodiment, because of the difference between the radius of curvature of the area on the one end side in the vehicle width direction (i.e., the side closer to the driver's seat) and the radius of curvature of the area on the other end side thereof, as viewed in the reflecting mirror 1012, as described above, the scale ratio in the area on the one end side becomes larger than the scale ratio in the area on the other end side. Because of this, any difference between the appearance of objects on the left-hand side and the appearance of objects on the right-hand side that is caused by the difference in the distance from the viewing point of the occupant M1000 of the driver's seat to the reflection positions on the mirror surface is canceled out. Accordingly, by using this rear under mirror 1010, as shown in FIG. 13, the driver M1000 is able to view the marker object T1001, which is on the left-hand side in the vehicle width direction, and the marker object T1002, which is on the right-hand side in the vehicle width direction, as mirror images T1001m and T1002m that have substantially the same shape and the same size.

The reflecting mirror 1012 which is employed in the rear under mirror 1010 according to the present embodiment is set such that objects of the same size that are the same distance from the center Cc1000 in the vehicle width direction are reflected in the reflecting mirror 1012 as images of the same size in the area on the one end side in the vehicle width direction, which area is closer to the driver's seat, and the area on the other end side in the vehicle width direction. Accordingly, the driver M1000 is able to rapidly and accurately ascertain the size of an object located in the bottom rear area of a vehicle, as well as a sense of the distance thereto.

Moreover, in the rear under mirror 1010 according to the present embodiment, the radius of curvature of the convex surface of the reflecting mirror is set so as to become gradually larger in a manner so as to approach the other end side in the vehicle width direction from the one end side in the vehicle width direction, which is closer to the driver's seat.

Because of this, irrespective of where in the vehicle width direction objects that are present in the lower area behind the vehicle body are located, variations in how those objects appear are reduced, and the driver is able to accurately ascertain the size of the object as well as a sense of the distance thereto. Furthermore, according to this rear under mirror 10, any sharp changes in the radius of curvature of the reflecting mirror 1012 in the vehicle width direction are minimized. As a result of this, it is possible to reduce distortion in mirror images, and restrict any deterioration in visibility.

Furthermore, according to the present embodiment, the rear under mirror 1010 is located at a center Cc1000 in the vehicle width direction of the back door 1002 which is protruding the furthest to the rear of the vehicle. Because of this, a wide range in the vehicle width direction of the lower area behind the vehicle can be reflected extremely well in the reflecting mirror 1012.

Moreover, according to the present embodiment, when the occupant M1000 of the driver's seat turns around from a central position in the vehicle to look behind at the reflecting mirror 1012, the reflecting mirror 1012 is set such that the center Cm1000 in the width direction of the reflecting mirror 1012 matches the center Cc1000 in the vehicle width direction of the rear portion of the vehicle body (i.e., the backdoor 1002m) that is reflected in the reflecting mirror 1012. Because of this, the vehicle occupant M1000 who is looking in the reflecting mirror 1012 is able to immediately recognize the distance to an object without having to go through the tedious recognition process of first searching on the mirror surface for the center Cc1000 in the vehicle width direction which is reflected in the reflecting mirror 1012, and then ascertaining the distance between the center Cc1000 and the object. Namely, the vehicle occupant M1000 is able to directly recognize the distance from the center Cc1000 in the vehicle width direction to the object based on the distance from the center Cm1000 in the width direction of the reflecting mirror 1012 to the object reflected in the mirror surface. Accordingly, the vehicle occupant M1000 who is looking in the reflecting mirror 1012 from the driver's seat is able to rapidly and accurately ascertain the situation in the lower area behind the vehicle.

Figure 15:
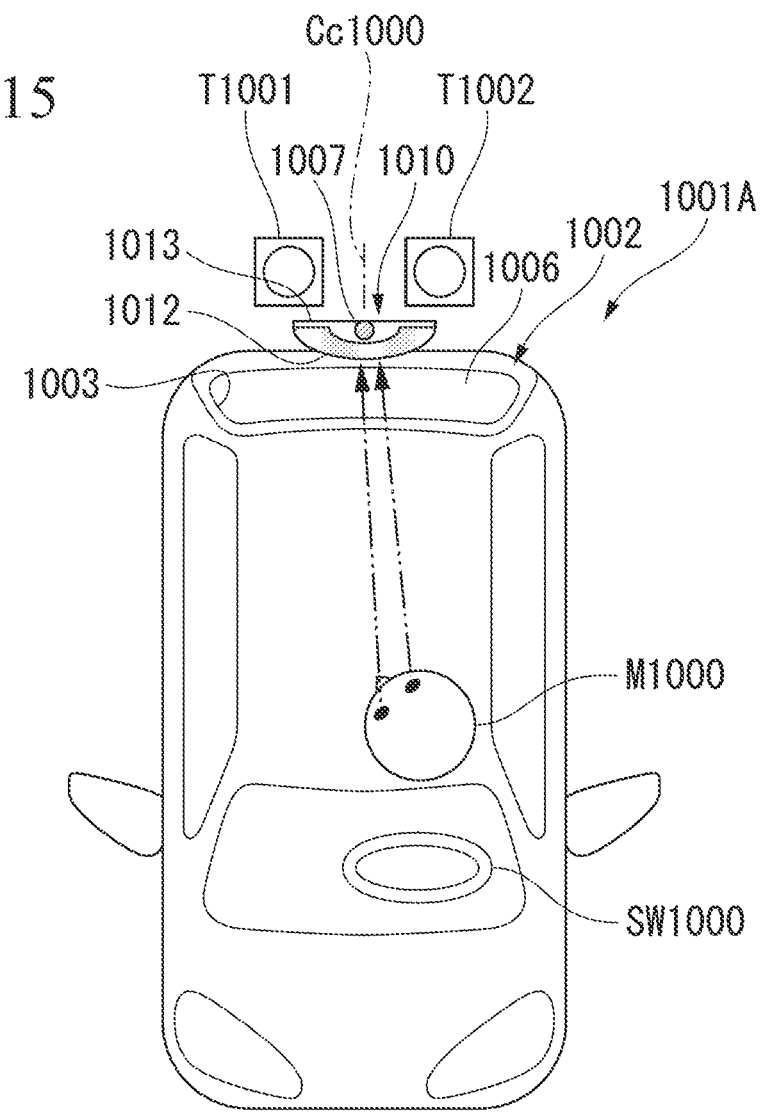
FIG. 15 is a schematic plan view showing a vehicle in which a variant example of the second embodiment of the present invention is shown.
Figure 16:
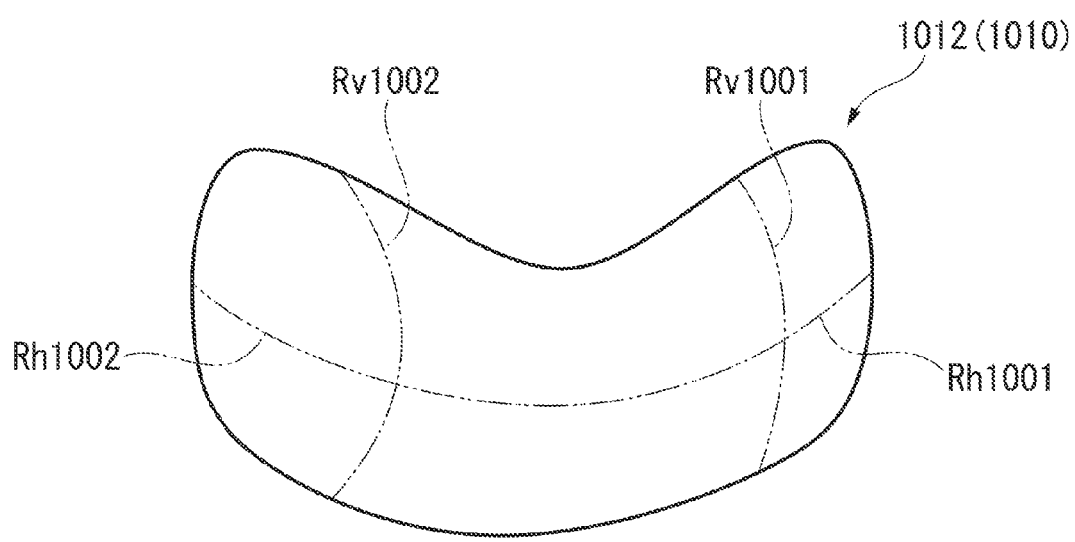
FIG. 16 is a schematic view showing a reflecting mirror of a rear under mirror according to a variant example of the second embodiment of the present invention.

An example has been described above in which the rear under mirror 1010 is employed in a right-hand drive vehicle in which the driver's seat is on the right-hand side in the direction of forward travel. As shown in FIG. 15, the rear under mirror 1010 can also be employed in the same way in a left-hand drive vehicle in which the driver's seat is on the left-hand side in the direction of forward travel. FIG. 16 shows the reflecting mirror 1012 of the rear under mirror 1010 when this is employed in a left-hand drive vehicle. in FIGS. 15 and 16, the same descriptive reference numerals are used for component elements that are the same as in the above-described example, with the reference numeral 1001A being used for the vehicle.

In the case of a left-hand drive vehicle, the position of the driver's seat is on the left-hand side as opposed to the above described right-hand drive vehicle in which the position of the driver's seat is on the right-hand side. Because of this, a large area of the radius of curvature of the convex surface of the reflecting mirror 1012 differs between the right-hand side and the left-hand side. The radius of curvature Rh1001 of the area on one end side in the vehicle width direction, which is closer to the driver's seat (i.e., to the vehicle occupant M1000), is smaller than the radius of curvature Rh1002 of the area on the other end side in the vehicle width direction.

In the case of this rear under mirror 1010 as well, the same type of effects as those described above can be obtained.

Next, a third embodiment, which is shown in FIGS. 17 through 20, will be described. In the description of this third embodiment, the same descriptive reference numerals are used for component elements that are the same as in the above-described second embodiment, and any duplicated description thereof is omitted.

Figure 17:
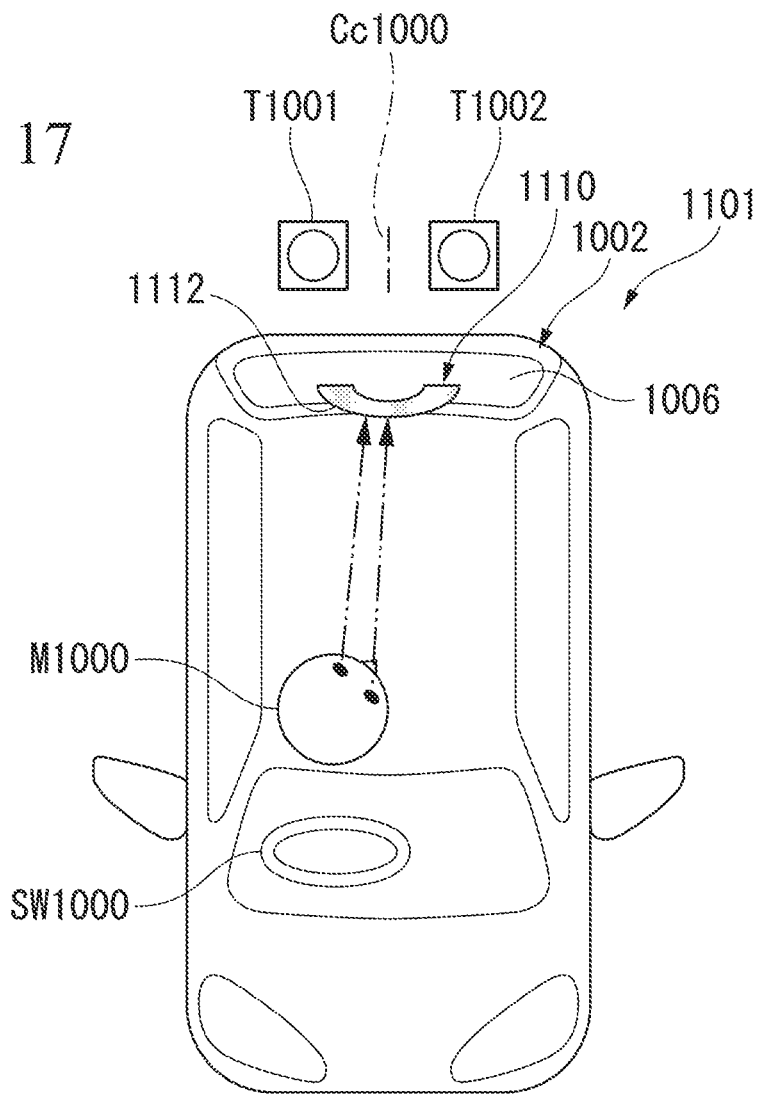
FIG. 17 is a schematic plan view showing a vehicle in which a rear under mirror according to a third embodiment of the present invention has been employed.

FIG. 17 is a schematic plan view showing a vehicle 1001. The vehicle 1001 is a right-hand drive vehicle in which a hatchback door 1002 is provided at a rear portion of the vehicle body. A rear under mirror 1010 which reflects the lower area behind the vehicle body towards an occupant M1000 of the driver's seat is mounted on a top edge portion on the vehicle compartment interior side of the backdoor 1002. In the case of the present embodiment, the rear under mirror 1010 is located in front of (i.e., on the vehicle compartment interior side) of the rear window glass 1006. In addition, the rear under mirror 1010 is placed in a central position in the vehicle width direction of the backdoor 1002 (i.e., the rear portion of the vehicle body).

Figure 18:
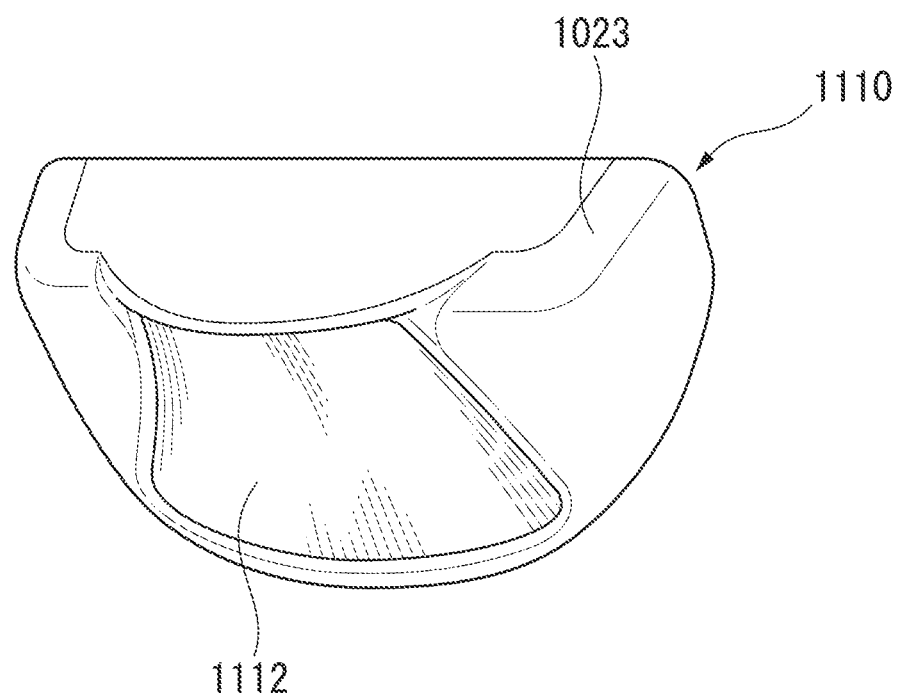
FIG. 18 is a perspective view showing the rear under mirror according to the third embodiment of the present invention.
Figure 19:
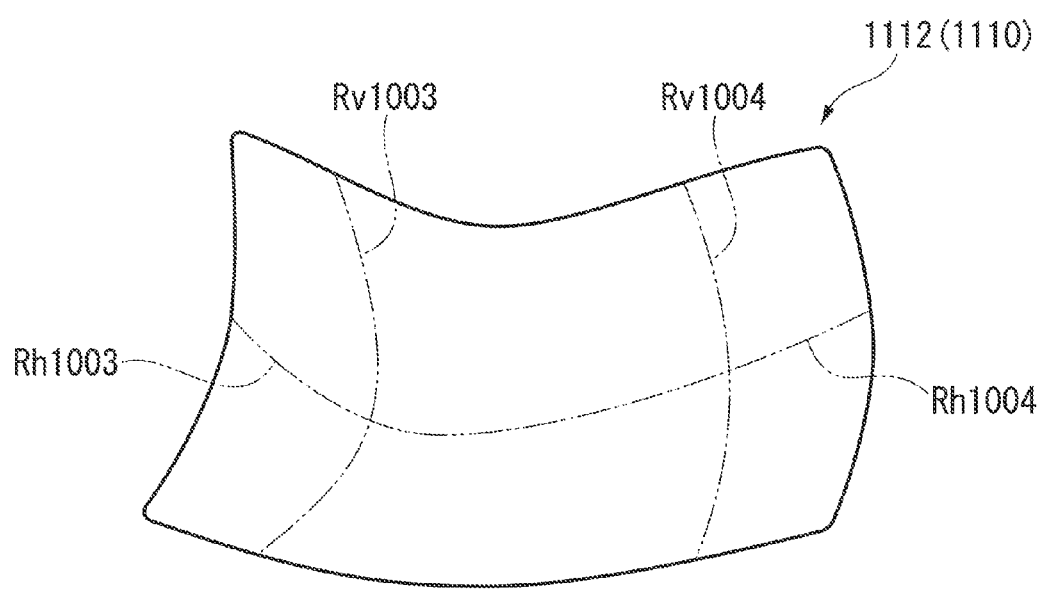
FIG. 19 is a schematic view showing a reflecting mirror of the rear under mirror according to the third embodiment of the present invention.
Figure 20:
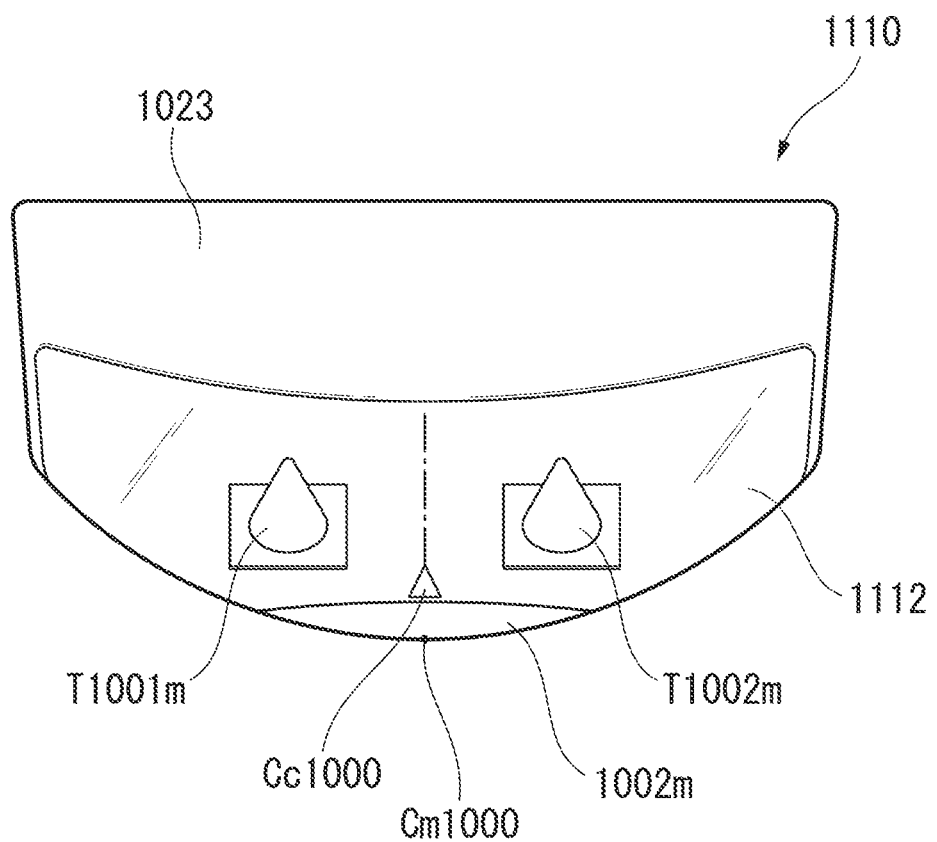
FIG. 20 is a view showing the rear under mirror according to the third embodiment of the present invention, and also an image which is shown on the mirror surface thereof.

FIGS. 18 through 20 show the rear under mirror 1110. The rear under mirror 1110 is provided with a reflecting mirror 1112 which reflects a lower area behind the vehicle body, a housing 1023 which is made from resin and holds the reflecting mirror 1112, and a base plate (not shown) which is directly fixed by bolts to the top edge portion on the vehicle compartment interior side of the back door 1002, and to which the housing 1023 is ultimately attached. in FIG. 19, the reflecting mirror 1112 is shown by itself, while, in FIG. 20, an image (i.e., a mirror image) showing the lower area behind the vehicle which is reflected in the reflecting mirror 1112 is also shown together with the reflecting mirror 1112.

The reflecting mirror 1112 is formed by a concavo-convex mirror that has a mirror surface that is concave in the vertical direction of the vehicle and convex in the vehicle width direction. In the case of the present embodiment, the shape of the mirror surface of the reflecting mirror 12 is formed by cutting the three-dimensionally curved concavo-convex surface in a substantially trapezoidal shape whose bottom side is longer than top side thereof. In addition, the reflecting mirror 1112 is installed on the back door 1002 via the housing 1023 and the base plate such that, when the back door 1002 is closed, the bottom end of the mirror surface slopes downwards and towards the rear of the vehicle body. If the reflecting mirror 1112 is installed in this manner, it is able to reflect a wide range of the lower area behind the vehicle as an erect image to the vehicle occupant who is sitting in the driver's seat (i.e., the driver). Namely, in the reflecting mirror 1112, the lower area behind a vehicle is reflected over a wide angle in the vehicle width direction by the surface of the concavo-convex mirror which is convex in a substantially horizontal direction. Moreover, by using this reflecting mirror 12, the image reflected on the mirror surface is changed by the mirror surface which is concave in a substantially vertical direction into an erect image which enables the driver to easily ascertain the situation behind their vehicle.

Here, the convex curvature in the vehicle width direction of the reflecting mirror 1112 does not have a uniform radius of curvature, and as shown in FIG. 19, a radius of curvature Rh1003 of an area on one end side (i.e., on the right-hand side of the vehicle) in the vehicle width direction, which is closer to the driver's seat (i.e., to the vehicle occupant M1000), is set smaller than a radius of curvature Rh1004 of an area on the other end side (i.e., on the left-hand side of the vehicle) in the vehicle width direction. In addition, the concave curvature in the vertical direction of the reflecting mirror 1112 does not have a constant radius of curvature, and, a radius of curvature Rv1003 of an area on one end side (i.e., on the right-hand side of the vehicle) in the vehicle width direction, which is closer to the driver's seat (i.e., to the vehicle occupant M1000), is set smaller than a radius of curvature Rv1004 of an area on the other end side (i.e., on the left-hand side of the vehicle) in the vehicle width direction. In addition, both the radius of curvature in the vehicle width direction and the radius of curvature in the vertical direction of the reflecting mirror 1112 are set so as to become gradually larger in a manner so as to approach the other end side in the vehicle width direction from the one end side in the vehicle width direction, which is closer to the driver's seat.

In the case of the present embodiment as well, when the occupant M1000 of the driver's seat turns around from a central position in the vehicle to look behind them (see FIG. 17), as shown in FIG. 20, the reflecting mirror 1112 is set such that the center Cm1000 in the width direction of the reflecting mirror 1112 matches the center Cc1000 in the vehicle width direction of the rear portion of the vehicle body (i.e., the backdoor 1002m) which is reflected in the reflecting mirror 1112.

As described above, in the rear under mirror 1110 according to the present embodiment as well, the curvatures of the convex surface and concave surface of the reflecting mirror 1112 are set such that the radii of curvature Rh1004 and Rv1004 of the area on the other end side in the vehicle width direction are larger than the radii of curvature Rh1003 and Rv1003 of the area on the one end side in the vehicle width direction which is closer to the driver's seat. Because of this, as seen in the reflecting mirror 1112, the scale ratio of the mirror image in the area on the one end side in the vehicle width direction is larger than the scale ratio of the mirror image in the area on the other end side in the vehicle width direction. As a result of this, in the rear under mirror 1110, due to the difference in the scales ratios of the mirror images in the left and right areas of the reflecting mirror 1112, any difference between the appearance of objects on the left-hand side and the appearance of objects on the right-hand side that is caused by the difference in the distance from the viewing point of the occupant M1000 of the driver's seat to the reflection positions on the mirror surface can be canceled out.

Accordingly, as shown in FIG. 20, the occupant M1000 of the driver's seat is able to view the marker objects T1001 and T1002, which are at equal distances on the left-hand and right-hand sides from the center Cc1000 in the vehicle width direction, as mirror images T1001m and T1002m that have substantially the same shape and the same size. Accordingly, the driver M1000 is able to rapidly and accurately ascertain the size of an object located in the lower area behind the vehicle, as well as a sense of the distance thereto.

Moreover, in the rear under mirror 1110 according to the present embodiment, both the curvature of the convex surface in the vehicle width direction of the reflecting mirror 1112 and the curvature of the concave surface in the vertical direction thereof are set such that the radii of curvature thereof become larger in a manner so as to approach the other end side in the vehicle width direction from the one end side in the vehicle width direction.

Because of this, the driver is able to accurately ascertain the size of the object as well as a sense of the distance thereto. Furthermore, it is possible to reduce distortion in the mirror surface, and restrict any deterioration in visibility.

Moreover, in the case of this rear under mirror 1110, the reflecting mirror 1112 is formed by a concavo-convex mirror and, as shown in FIG. 20, the lower area behind a vehicle body can be reflected as an erect image. As a result, the situation in the lower area at the rear of a vehicle body can be accurately ascertained by the occupant M1000 of the driver's seat without any confusing images being shown to this occupant M1000.

Figure 21:
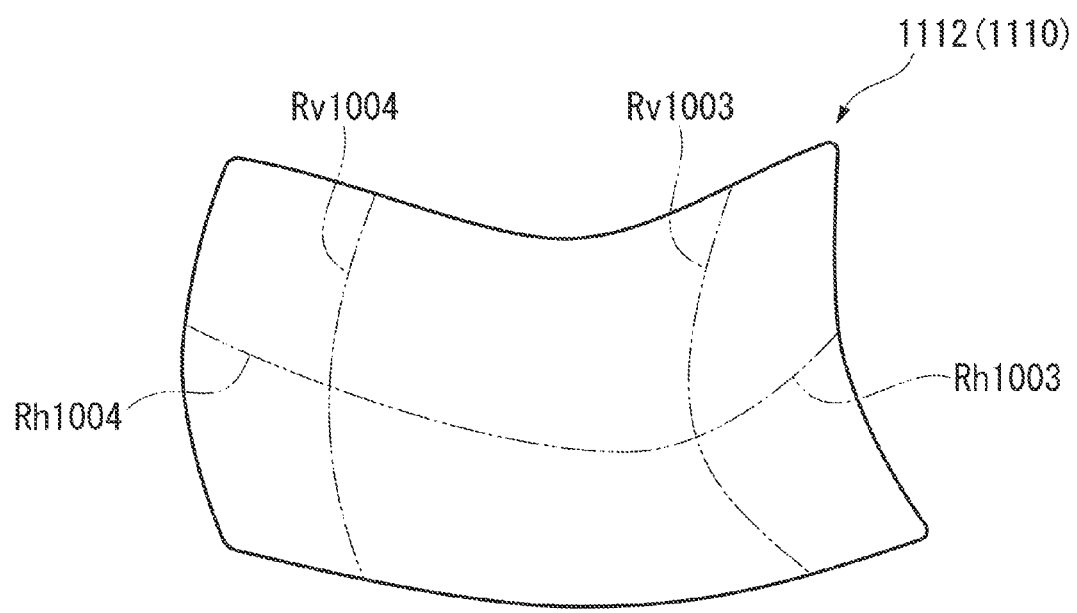
FIG. 21 is a schematic view showing a reflecting mirror of a rear under mirror according to a variant example of the third embodiment of the present invention

FIG. 21 shows a reflecting mirror 1112 of the rear under mirror 1110 when this is employed in a left-hand drive vehicle.

A large area of the radius of curvatures of both the concave surface and the convex surface of the reflecting mirror 1112 in the case of a left-hand drive vehicle differs between the right-hand side and the left-hand side. The radius of curvature Rh1003 of the area on one end side in the vehicle width direction, which is closer to the driver's seat (i.e., to the vehicle occupant M1000), is smaller than the radius of curvature Rh1004 of the area on the other end side in the vehicle width direction.

the present invention is not limited to the above-described embodiments and various design modifications may be made thereto insofar as they do not depart from the spirit or scope of the present invention. For example, in the above-described embodiments, cases are described in which the reflecting mirror is a convex mirror and in which the reflecting mirror is a concavo-convex mirror. However, the present invention can also be applied when the reflecting mirror is a concave mirror. Even if a concavo-convex mirror is used for the reflecting mirror, it is possible for the vehicle width direction to be a concave surface and for the vertical direction to be a convex surface. In these cases as well, if the curvature is set such that the radius of curvature of the area on the one end side in the vehicle width direction, which is closer to the driver's seat, is smaller than the radius of curvature of the area on the other end side in the vehicle width direction, then the same type of effects can be obtained.

What is claimed is:

1. A rear under mirror that is placed near a top edge portion of a rear window glass on a vehicle compartment interior side thereof, the rear under mirror comprising:
    a reflecting mirror that reflects a lower area behind a vehicle towards a driver's seat,
    the reflecting mirror comprising a concavo-convex mirror having a mirror surface that is formed as a concave surface in a substantially vertical direction and as a convex surface in a substantially horizontal direction,
    the reflecting mirror having a radius of curvature of the convex surface in a substantially horizontal direction of the reflecting mirror in the bottom portion area is larger than that of the top portion area,
    the reflecting mirror having a trapezoidal shape whose bottom side is longer than top side when viewed from a front thereof.

2. The rear under mirror according to claim 1, wherein the radius of curvature of the convex surface in the substantially horizontal direction of the reflecting mirror becomes gradually larger in a manner so as to approach the bottom portion area from the top portion area.

3. The rear under mirror according to claim 1, wherein the mirror surface of the reflecting mirror is bilaterally symmetric in a vehicle width direction.

4. The rear under mirror according to claim 1, wherein
    a radius of curvature of the concave surface in a substantially vertical direction of the reflecting mirror in a bottom portion area is smaller than that of a top portion area.

5. The rear under mirror according to claim 3, wherein the radius of curvature of the concave surface in the substantially vertical direction of the reflecting mirror becomes gradually smaller in a manner so as to approach the bottom portion area from the top portion area.

6. The rear under mirror according to claim 1, wherein an acute bend area in which the radius of curvature of the concave surface in the substantially vertical direction is smaller than in other areas is provided in an area adjacent to a bottom end of the reflecting mirror.

7. The rear under mirror according to claim 6, wherein an area adjacent to the bottom end of the concave surface in the substantially vertical direction of the reflecting mirror reflects a rear end portion of the vehicle.

8. The rear under mirror according to claim 1,
    wherein the radius of curvature of a mirror surface of the reflecting mirror on one end side which is closer to the driver's seat in a vehicle width direction is smaller than that of the other end side in the vehicle width direction.

9. The rear under mirror according to claim 8, wherein the mirror surface is provided with a convex surface that is formed in a convex shape in a substantially horizontal direction.

10. The rear under mirror according to claim 8, wherein the mirror surface is provided with a concave surface that is formed in a concave shape in a substantially horizontal direction.

11. The rear under mirror according to claim 8, wherein the mirror surface is provided with a convex surface that is formed in a convex shape in a substantially vertical direction.

12. The rear under mirror according to claim 8, wherein the mirror surface is provided with a concave surface that is formed in a concave shape in a substantially vertical direction.

13. The rear under mirror according to claim 8, wherein the radius of curvature of the mirror surface becomes larger in a manner so as to approach the other end side in the vehicle width direction from said one end side which is closer to the driver's seat in the vehicle width direction.

14. The rear under mirror according to claim 8, wherein the curvature of the reflecting mirror is set such that objects of the same size that are the same distance from the center of the vehicle width direction are reflected as images of the same size in both said one end side in the vehicle width direction, which area is closer to the driver's seat, and the other end side in the vehicle width direction.

15. The rear under mirror according to claim 8, wherein the reflecting mirror is positioned in the center in the vehicle width direction of the rear portion of the vehicle body.

* * * * *